(12) United States Patent
Thayer et al.

(10) Patent No.: US 8,768,815 B1
(45) Date of Patent: Jul. 1, 2014

(54) SEASONAL PORTFOLIO CONSTRUCTION PLATFORM APPARATUSES, METHODS AND SYSTEMS

(71) Applicant: FMR, LLC, Boston, MA (US)

(72) Inventors: Philip K. Thayer, Belmont, MA (US); Miles F. Betro, Walpole, MA (US); Lisa J. Emsbo-Mattingly, Lexington, MA (US)

(73) Assignee: FMR, LLC, Boston, MA (US)

( * ) Notice: Subject to any disclaimer, the term of this patent is extended or adjusted under 35 U.S.C. 154(b) by 0 days.

(21) Appl. No.: 14/137,971

(22) Filed: Dec. 20, 2013

(51) Int. Cl.
*G06Q 40/06* (2012.01)

(52) U.S. Cl.
CPC .................................. *G06Q 40/06* (2013.01)
USPC .............................. 705/36 R; 705/35; 705/37

(58) Field of Classification Search
CPC ........ G06Q 40/06; G06Q 40/00; G06Q 40/04
USPC ............................................ 705/35, 36 R, 37
See application file for complete search history.

(56) References Cited

U.S. PATENT DOCUMENTS

| 7,050,998 B1 * | 5/2006 | Kale et al. ................... 705/36 R |
| 2008/0208769 A1 * | 8/2008 | Beer et al. ................... 705/36 R |

* cited by examiner

*Primary Examiner* — Jagdish Patel
(74) *Attorney, Agent, or Firm* — Cooley LLP; Jiaping (Charlene) Liu

(57) ABSTRACT

The SEASONAL PORTFOLIO CONSTRUCTION PLATFORM APPARATUSES, METHODS AND SYSTEMS ("SPC") transform user data request via SPC components into seasonal portfolio investment transaction records. In one implementation, the SPC may provide an investment analytics and management tool facilitating a user (e.g., investors, consumers, portfolio managers, traders, etc.) to research, build and maintain an investment strategy for a customized portfolio based on a current economic cycle phase.

20 Claims, 33 Drawing Sheets

SPC Example: Economic Cycle based Investment

SPC Example: Economic Cycle based Investment

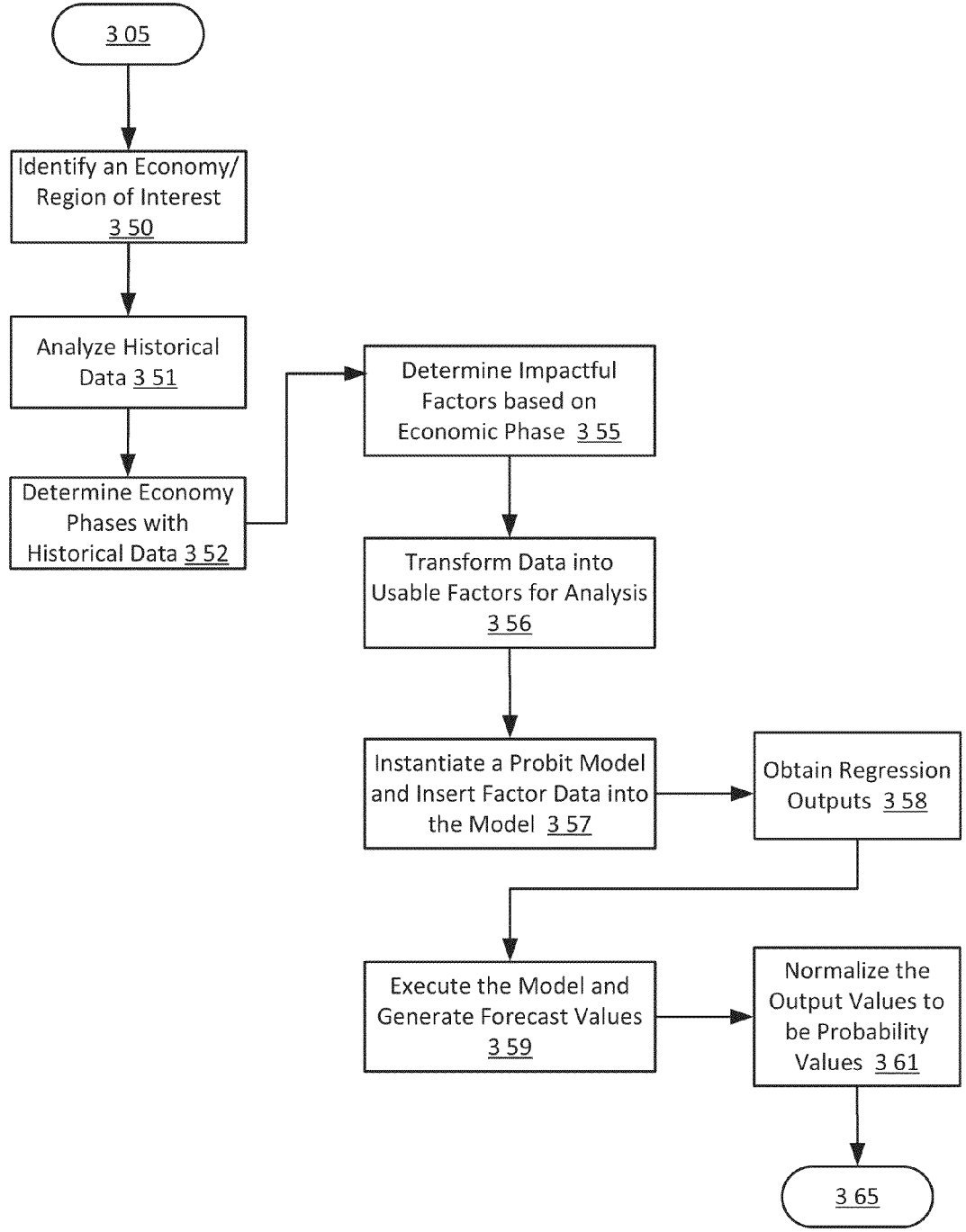
FIGURE 3B     SPC Logic Flow: Generate Probabilities of Each Phase

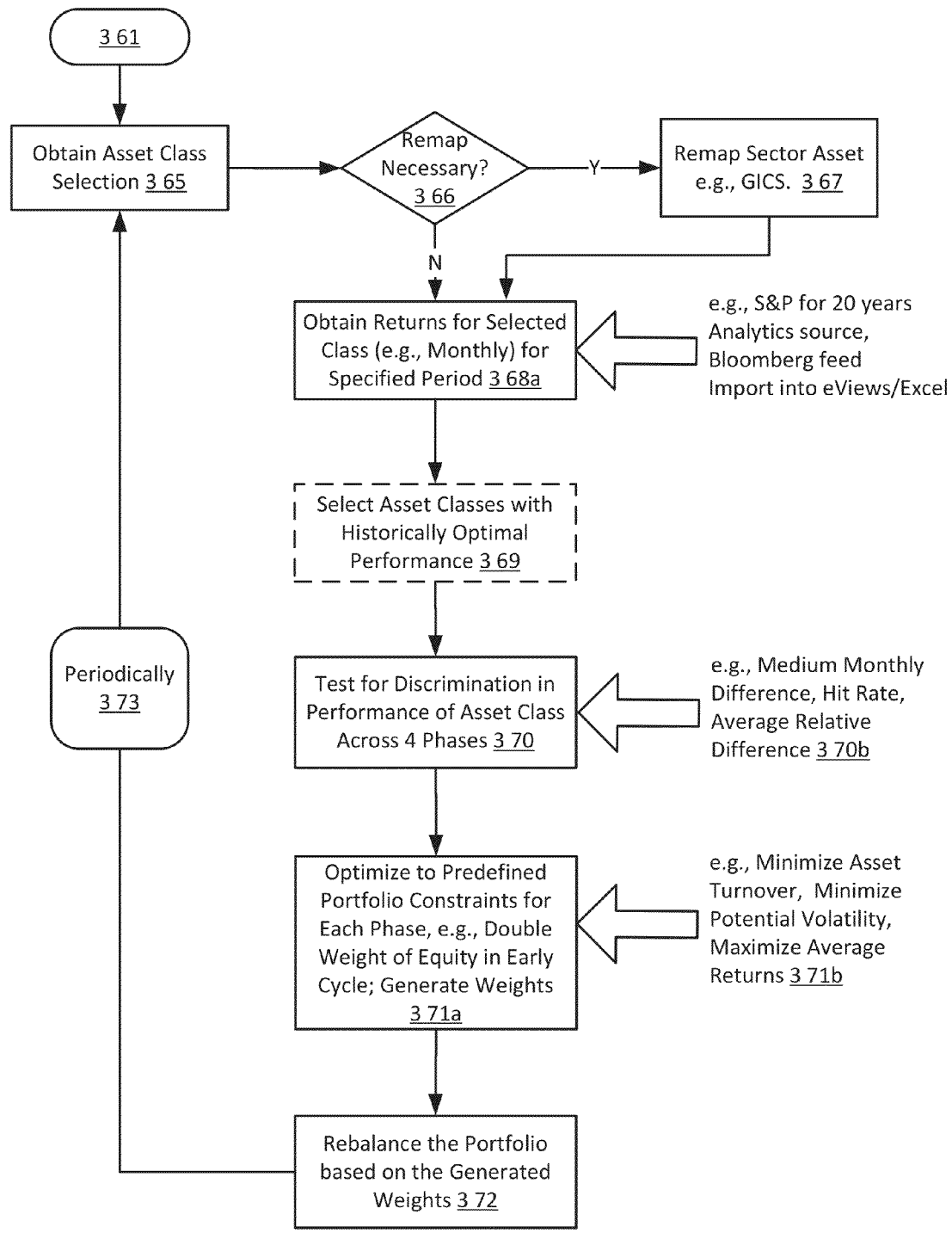
FIGURE 3C            SPC Logic Flow: Seasonal Portfolio Construction

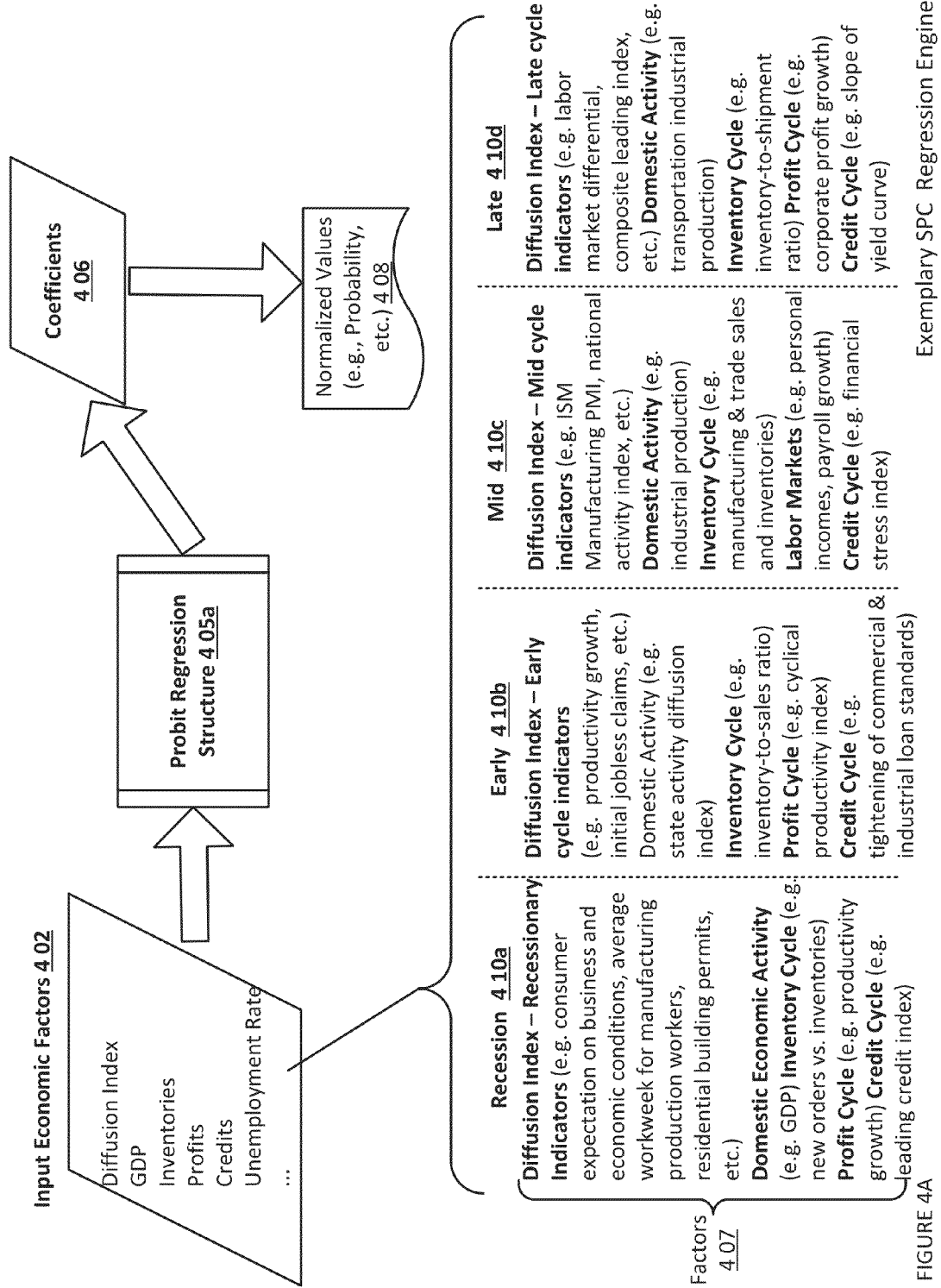
FIGURE 4A  Exemplary SPC Regression Engine

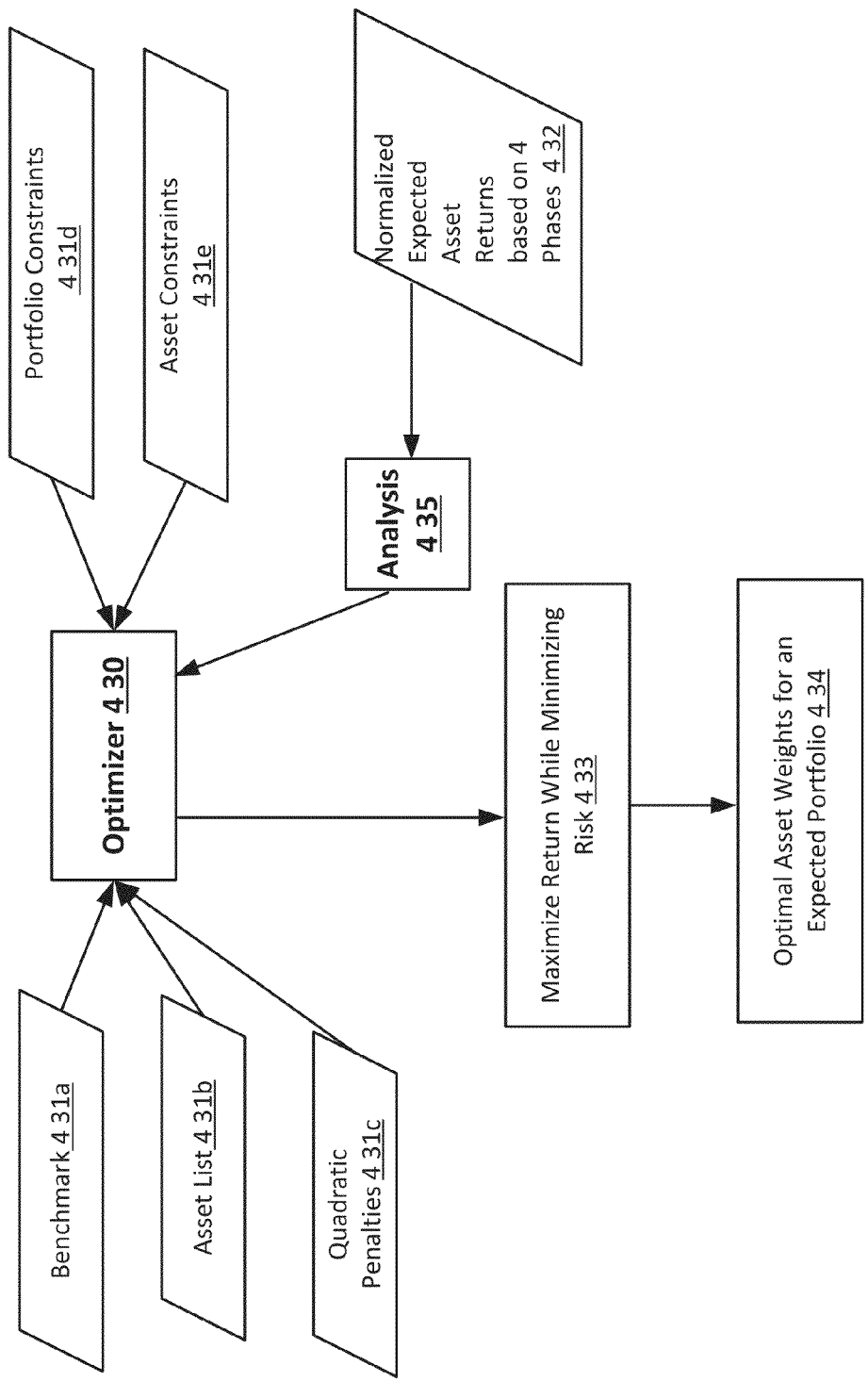
FIGURE 4C  Exemplary SPC Flow: Generate Optimal Portfolio for a Phase

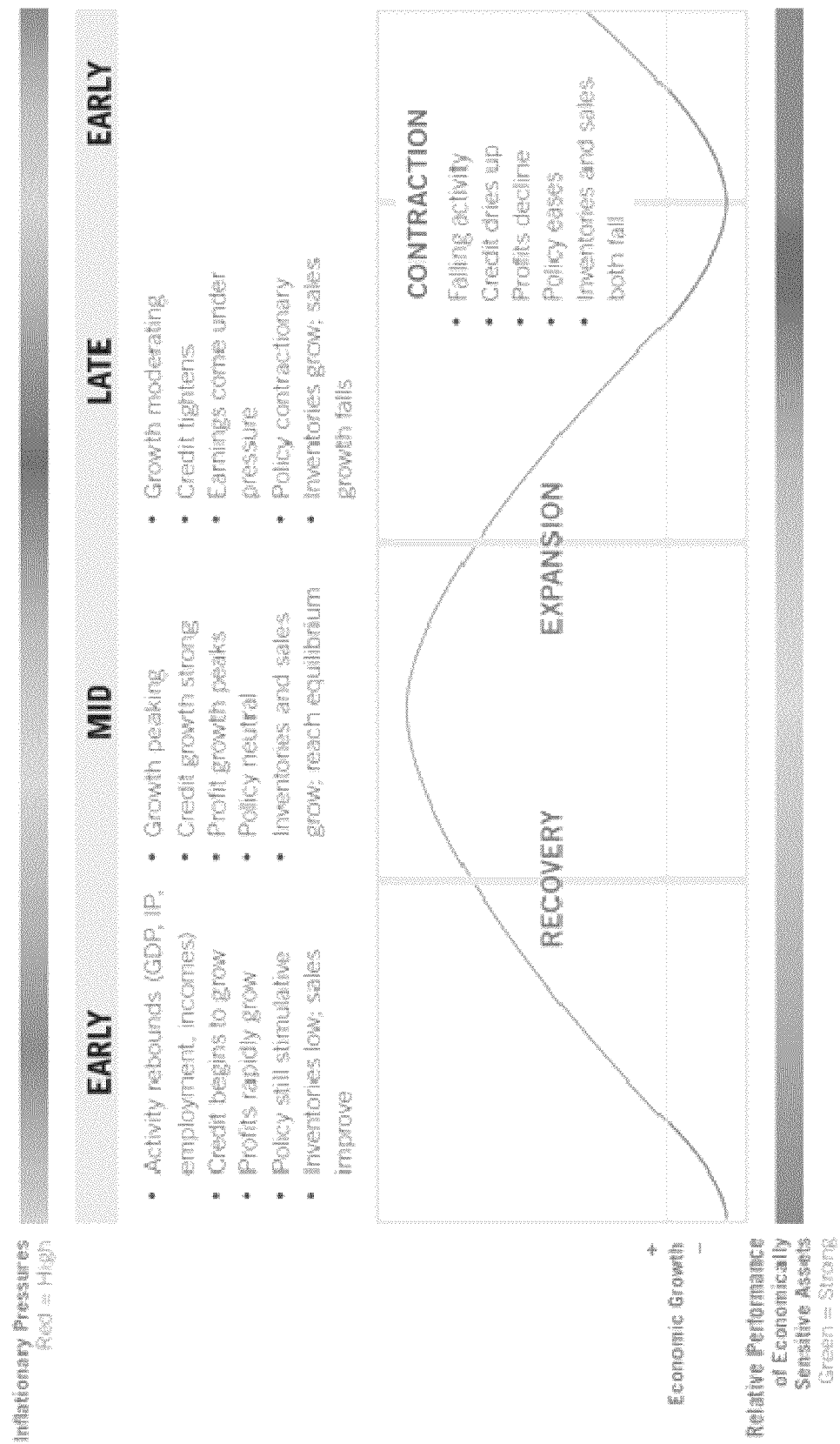
FIGURE 5A  Exemplary SPC Data Analytics

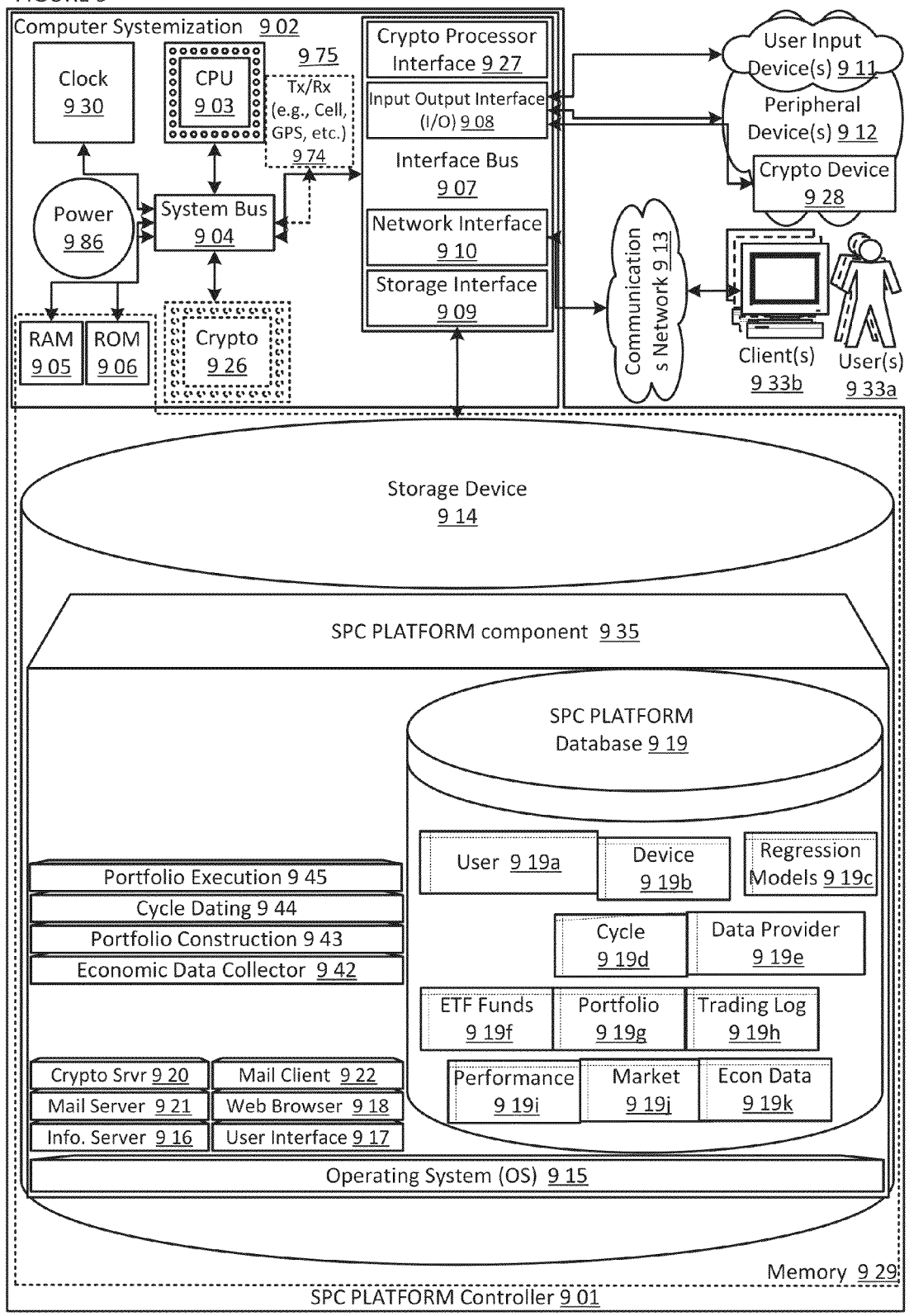

US 8,768,815 B1

SEASONAL PORTFOLIO CONSTRUCTION PLATFORM APPARATUSES, METHODS AND SYSTEMS

This application for letters patent discloses and describes various novel innovations and inventive aspects of SEASONAL PORTFOLIO CONSTRUCTION PLATFORM technology (hereinafter "SPC") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for investment portfolio management, and more particularly, include SEASONAL PORTFOLIO CONSTRUCTION PLATFORM APPARATUSES, METHODS AND SYSTEMS ("SPC").

BACKGROUND

Consumers invest in financial instruments to pursue an economic profit. Consumers buy publicly traded financial instruments from a public trading exchange platform (i.e., an outcry bidding system). Common publicly traded financial instruments are stocks, bonds, future contracts, and options. Consumers can buy or sell one or more types of financial instruments to form an investment portfolio. In order to manage the performance of the investment portfolio, consumers need to closely track the pricing index of each financial instrument in the portfolio on a daily basis.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIGS. 3A-3C provide example logic flow diagrams illustrating aspects of work flows for seasonal portfolio construction, economic cycle phase dating within embodiments of the SPC;

FIGS. 4A-4B provide example combined data and logic flow diagram illustrating a regression engine for dating the economic cycle phase within embodiments of the SPC;

FIG. 4C provides an example logic flow diagram illustrating aspects of generating an optimal portfolio for a cycle phase within embodiments of the SPC;

FIGS. 5A-5G provide exemplary data analytics charts illustrating various economic indicators within embodiments of the SPC;

FIG. 9 shows a block diagram illustrating example aspects of a SPC controller.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The SEASONAL PORTFOLIO CONSTRUCTION PLATFORM technology (hereinafter "SPC") provides an investment analytics and management tool facilitating a user (e.g., investors, consumers, portfolio managers, traders, etc.) to research, build and maintain an investment strategy for a customized portfolio based on a current economic cycle phase.

Seasonal Portfolio Construction Platform (SPC)

Figure 1A:
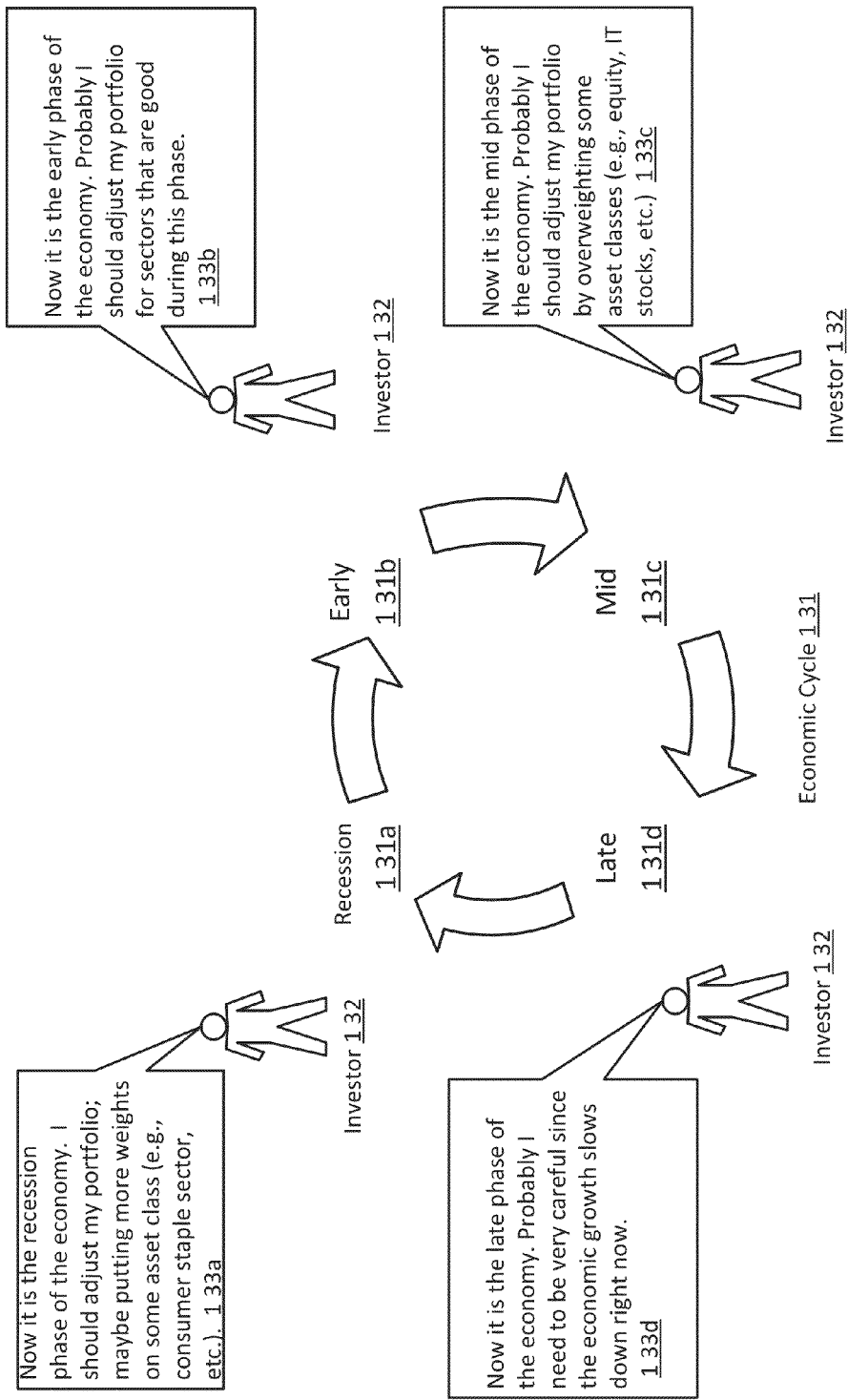
FIG. 1A provides an example diagram illustrating aspects of economic cycle based investment management within embodiments of the SPC.

FIG. 1A provides an example diagram illustrating aspects of portfolio construction based on the phase of business and/or economy cycle within embodiments of the SPC. In one implementation, asset prices (e.g., pricing of stocks, bonds, options, future contracts, and/or other derivatives, etc.) may fluctuate over the business cycle and their performance may vary over the different phases. As such, an investor 132 may adjust their investment portfolio parameters based on investment return analytics of the different phases of the business cycle, e.g., recession 131*a*, early cycle 131*b*, mid cycle 131*c*, and late cycle 131*d*.

For example, in one implementation, if the investor 132 determines they are at a recession phase of the business cycle, the investor 132 may adjust the portfolio to reduce investment on sectors that are most impacted by the recess, e.g., real estate, luxury goods, etc. In one implementation, the investor 132 may increase the weights of investment in some asset class (e.g., the consumer staples sector, etc.), which may be less impacted by the economic recession 133*a*.

As another example, the investor may choose to adjust the portfolio at the early phase of the business and/or economy 133*b*, e.g., selecting sectors that have historically performed well in the early phase. As another example, at the mid cycle of the business, when economic growth rate is at its peak, the investor 132 may increase weights on some asset classes (e.g., equity, IT stocks, etc.), e.g., 133*c*. As another example, at the late cycle of the business, when the economy slows down and approaches recession, the investor may need to be careful about investing in high-risk sectors as the economic growth may slow down during this stage.

Figure 1B:
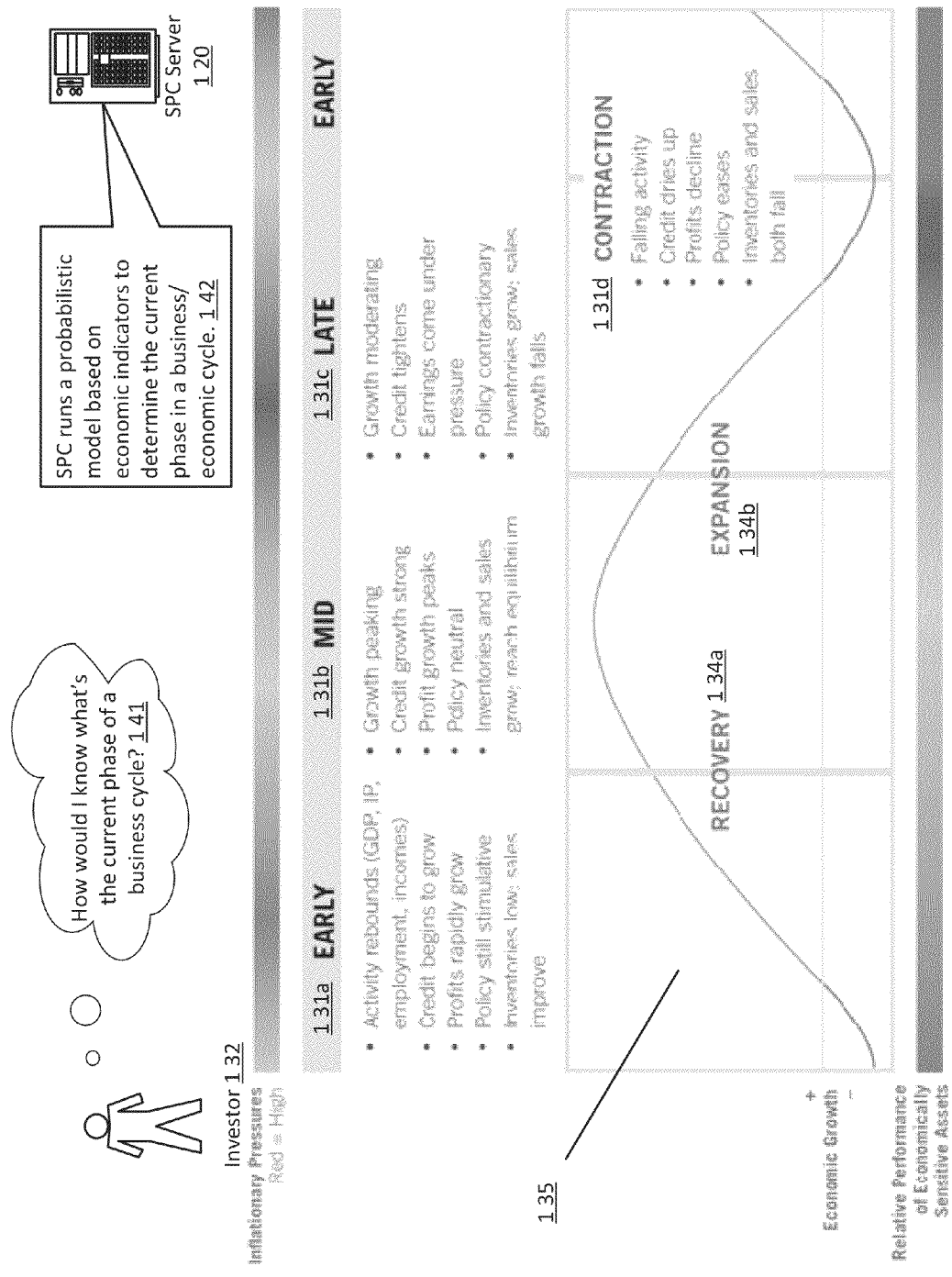
FIG. 1B provides an example diagram illustrating aspects of economic cycle phase determination within embodiments of the SPC.

FIG. 1B provides an example diagram illustrating aspects of determining business and/or economy cycle within embodiments of the SPC. In one implementation, as the investor may desire to construct and/or adjust the investment portfolio based on the current phase of a business cycle 141, the investor needs to understand how to determine what economic phase it is. In one implementation, the SPC server may provide a systematic approach for delineating stages of the cycle—recess, early, mid and late—so that the SPC may analyze asset returns within each business-cycle phase, and in turn inform asset allocation decisions. For example, as further discussed in FIG. 3B, the SPC may employ a probabilistic model (e.g., a probit regression model, etc.) based on economic indicators to determine the current phase of a business cycle 142.

In one implementation, aggregate business cycle fluctuations may reflect many aspects of the macroeconomy, including production, prices, employment, investment and consumption, and/or the like. Asset returns, may consequently have a strong cyclical component, with earnings, the interest rates and inflation determined by developments in the economy. Based on the macroeconomic indicators, the SPC may identify, retrospectively, phases of the business cycle as recess, early, mid and late, using a set of censoring rules on a plurality of indicators of the cycle, such as but not limited to corporate profits, credit, employment, inventories, and monetary policy. The phases may be chronological, and each phase may be 'dated' when half or more of the indicators (if data are available) signal a positive for that phase, e.g., see 410a-d in FIG. 4A.

As shown by the chart 135, the SPC may evaluate economic indicators to delineate the phase of the cycle. In one implementation, the early phase 131a of the recovery occurs when policy stimulus begins to take effect and pent-up demand boils over. Exemplary economic indicators in the early phase 131a may include: real activity picks up; low interest rates encourage borrowing; sales unexpectedly increase but companies hold off re-stocking until they see sustained strength; and businesses may see rapid margin expansions and soaring profits, as they have trimmed all the fat from their operations during the recession.

With the recovery 134a gaining traction, at the mid cycle 131b, where confidence in the strength of the recovery builds, economic indicators may include: both credit and profit growth is strong; employment gains are steady; growth peaks; and policy moves to a neutral stance.

In one implementation, the expansion 134b may continue for a while as the economy spends most of its time in expansion but eventually it begins to brush up against capacity constraints, and policy tightens in response to building inflationary pressures. The business cycle may arrive at the late cycle 131c. Exemplary economic indicators at late cycle 131d may include: growth slows; banks scale back lending, and the rising price of credit dampens demand; firms accumulate inventory as sales weaken, which puts pressure on their earnings; policy may be slow to respond to the imminent crash, so settings remain contractionary (though becoming less restrictive toward the end).

In one implementation, as the business cycle rolls into the contraction 131d, the SPC may observe widespread falling real activity. Exemplary economic indicators at this stage may include: tight financial conditions result in shrinking demand; corporate profits plummet in line with sales revenues; companies pare back production and de-stock; and there is aggressive policy easing.

Figure 2:
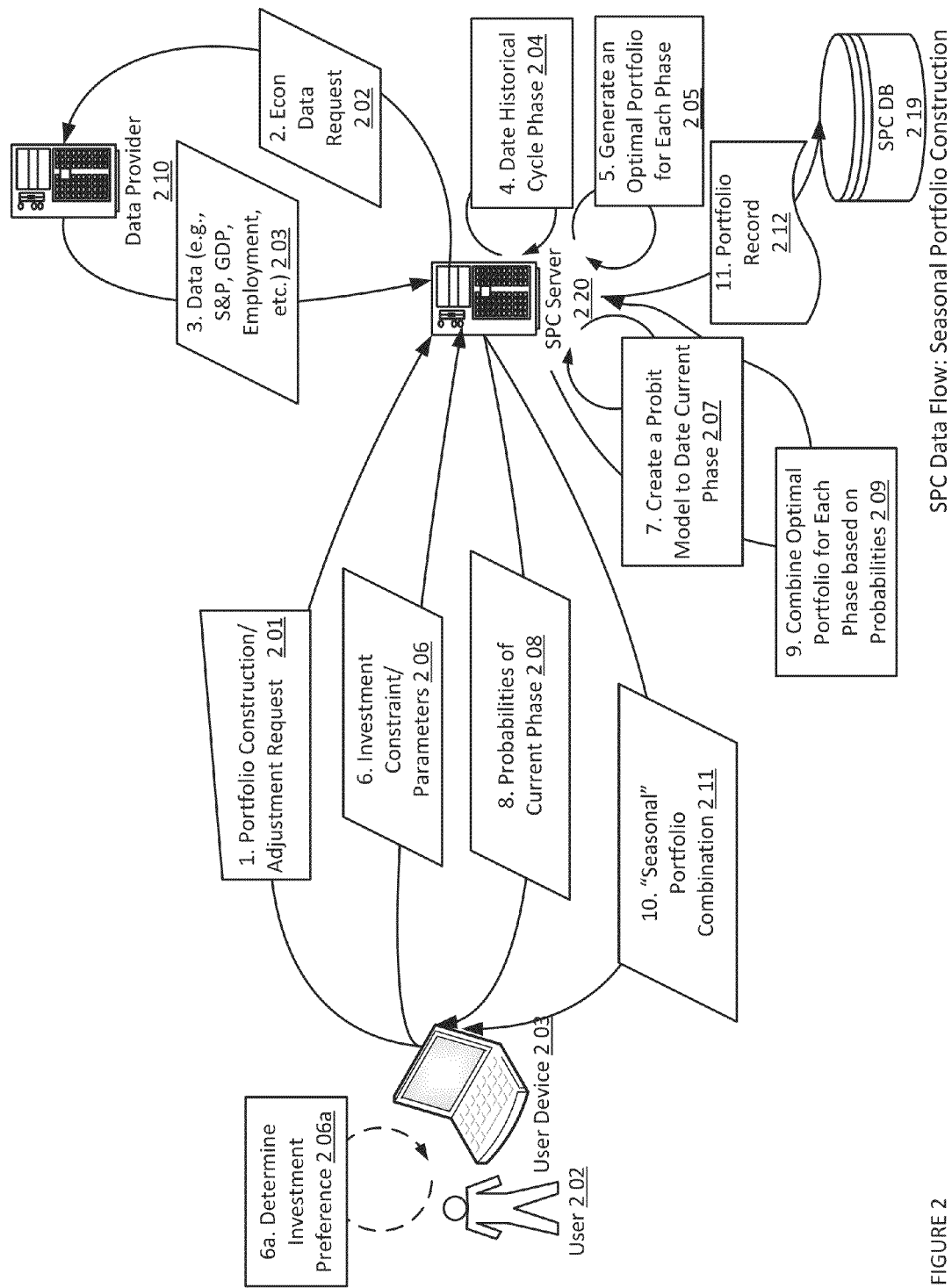
FIG. 2 provides an example datagraph diagram illustrating aspects of interactive data flows between the SPC server and its affiliated entities for seasonal portfolio construction within embodiments of the SPC.

FIG. 2 provides an example datagraph diagram illustrating aspects of interactive data flows between the SPC server and its affiliated entities for seasonal portfolio construction within embodiments of the SPC. Within embodiments, a SPC server 220, a user 202 (e.g., a consumer, an individual investor, a portfolio manager, a broker, etc.), a user device 203, a data provider 210 (e.g., Bloomberg, National Science Foundation economic data sharing, etc.), a SPC database 219, and/or the like, may interact and exchange data messages via a communication network with regard to business/economic cycle "dating" and portfolio construction within embodiments of the SPC.

In one embodiment, a user 202 may operate a user device 203, which may include any of a desktop computer, a laptop computer, a tablet computer, a Smartphone (e.g., a BlackBerry, an Apple iPhone, a Google Android, a HTC, a Samsung Galaxy, etc.), and/or the like. In one implementation, the user device 203 may send a portfolio construction, adjustment, and/or rebalancing request 201 to the SPC server 220, wherein the request may comprise an inquiry on the investment portfolio allocation strategy, e.g., the portfolio allocation to equity, bonds, and/or other assets, etc. For example, the user device 203 may generate a (Secure) Hypertext Transfer Protocol ("HTTP(S)") message including a portfolio construction and/or adjustment request 201 in the form of data formatted according to the eXtensible Markup Language (XML). An example listing of a portfolio construction, adjustment and/or rebalancing request 201, substantially in the form of a HTTP(S) message including XML-formatted data, is provided below:

```
POST /portfolio_request.php HTTP/1.1
Host: 192.168.23.126
Content-Type: Application/XML
Content-Length: 867
<?XML version="1.0" encoding="UTF-8"?>
<portfolio_request>
<session_id> HUUUSDWE </session_id>
<timestamp> 2014-02-22 15:22:43</timestamp>
<user_id> JS001 </user_id>
<client_details>
   <client_IP>192.168.23.126</client_IP>
   <client_type>smartphone</client_type>
   <client_model>HTC Hero</client_model>
   <device_id> HTC_JS_001 </device_id>
   ...
<client_details>
...
<request> construction </request>
<portfolio_amount> 10,000 </portfolio_amount>
<- !optional - ->
<constituent>
   <type_1> equity </type_1>
   <type_2> bonds </type_2>
   ...
</constituent>
...
<portfolio_request>
```

In the above example, the user 202 may optionally specify desired investment instrument types, e.g., equity, bonds, etc., and the SPC server 220 may provide an allocation percentage for each type accordingly.

In one implementation, the SPC server 220 may obtain and/or update economic data from a data provider 210, e.g., a database and/or server that aggregate economic indicator data, etc. In one implementation, an example listing of the economic data request 202, substantially in the form of a HTTP(S) message including XML-formatted data, is provided below:

```
POST /data_request.php HTTP/1.1
Host: 192.168.23.126
Content-Type: Application/XML
Content-Length: 867
<?XML version="1.0" encoding="UTF-8"?>
<benchmark_request>
<session_id> HUUUSDFSF&*&FDS </session_id>
<timestamp> 2014-02-22 15:22:43</timestamp>
...
<request_data>
```

```
<start_time> Jan-2014 </start_time>
<end_time> dec-2014 </end_time>
<type>
    <type_1> unemployment </type_1>
    <type_2> index </type_2>
    <type_3> GDP </type_3>
    ...
</type>
<request_data>
<acceptable_format> CSV, xml </acceptable_format>
...
<data_request>
```

In one implementation, the SPC server 220 may receive the requested economic indicators 203 from the data provider 210, e.g., in the form of a ".csv" files, Excel spreadsheet, and/or the like.

Figure 4B:
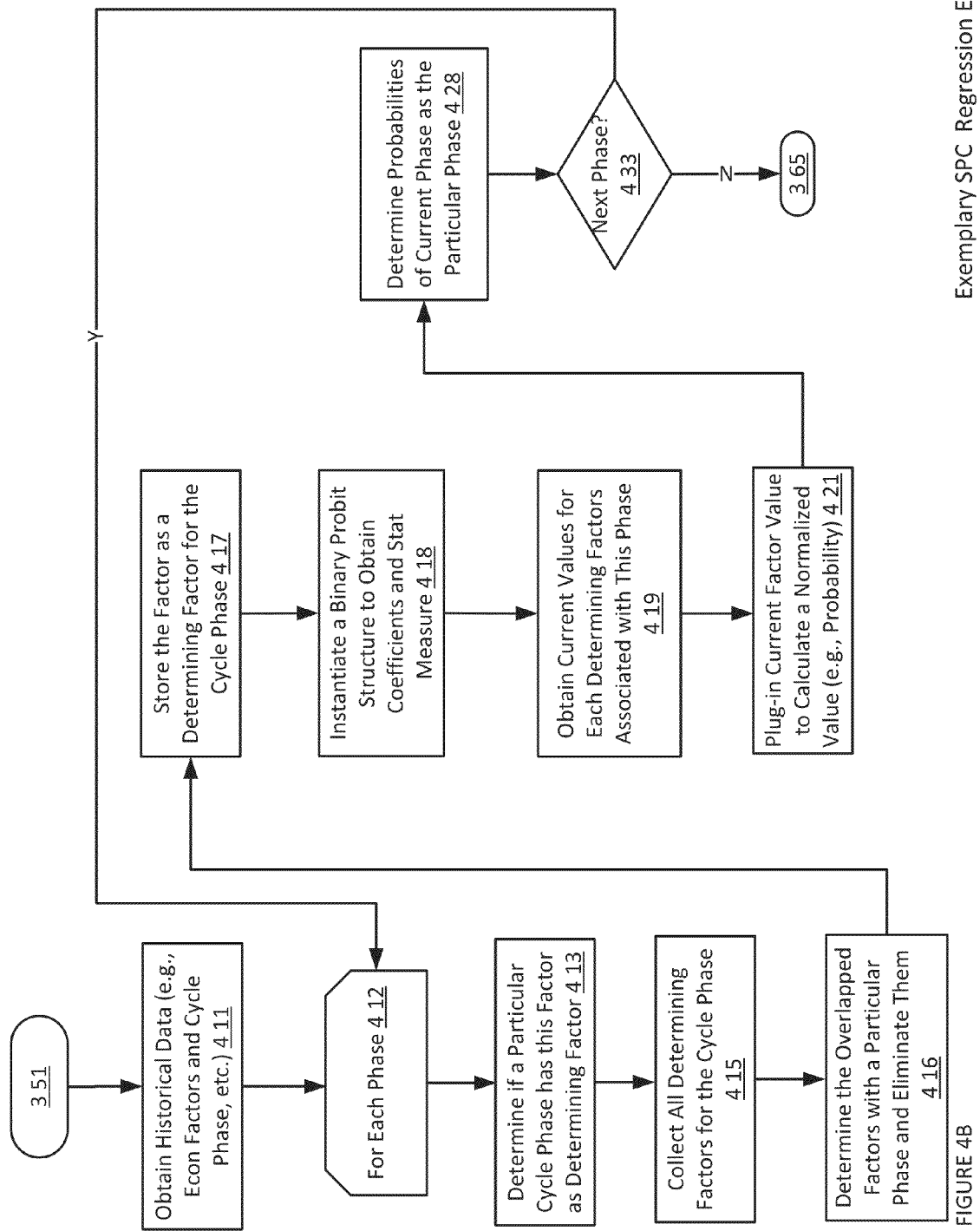

In one implementation, the SPC server 220 may analyze the obtained historical data 203 to determine economic indicator characteristics associated with each economic/business cycle phase 204, e.g., "date" the historical economic cycle, etc., as further discussed in FIGS. 4A-4B. In one implementation, the SPC may then analyze historical market performance to generate an optimal portfolio associated with each economic business cycle phase 205, e.g., see FIG. 4C. In one implementation, the obtaining historical data 202-203 and dating historical cycle phase and generating/updating optimal portfolio for a phase 204-205, may be conducted periodically, e.g., with updated data.

In one implementation, the user 202 may determine investment preferences 206a, and submit investment constraint and/or parameters 206, e.g., a maximum allocation percentage of one asset type, a maximum allocation percentage of a holding, etc. In one implementation, an example listing of a user investment constraint/parameter request 206, substantially in the form of a HTTP(S) message including XML-formatted data, is provided below:

```
POST /user_setting.php HTTP/1.1
Host: 192.168.23.126
Content-Type: Application/XML
Content-Length: 867
<?XML version="1.0" encoding="UTF-8"?>
<user_setting>
<session_id> HUUUSDWE </session_id>
<timestamp> 2014-02-22 15:22:43</timestamp>
<user_id> JS001 </user_id>
<client_details>
    <client_IP>192.168.23.126</client_IP>
    <client_type>smartphone</client_type>
    <client_model>HTC Hero</client_model>
    <device_id> HTC_JS_001 </device_id>
    ...
<client_details>
...
<portfolio_id> JS_MyUS </portfolio_id>
<portfolio_name> my US investment </portfolio_name>
<portfolio_date> 2014-02-02 </portfolio_date>
<portfolio_setting>
    <setting_1>
        <asset> equity </asset>
        <max_alloc> 30%</max_alloc>
        ...
    </setting_1>
    <setting_1>
        <asset> equity </asset>
        <restriction> ABC </restriction>
        ...
    </setting_2>
</portfolio_setting>
...
<user_setting>
```

In the above example, a user 202 may configure a maximum allocation percentage of equity to be 30%; and may restrict investment in stock symbol "ABC" (e.g., for conflict reasons, etc.).

In one implementation, the SPC server may create a probit regression model to "date" the current economic business cycle phase 207 (e.g., see FIG. 4B, etc.), which may generates probabilities of the current economic phase. For example, the SPC may determine, via the regression model, that the probability of being in an early economic phase is 0.3, the probability of being in a mid cycle is 0.7, and/or the like. Within implementations, an example listing of the regression probabilities of current phase message 208, substantially in the form of a HTTP(S) message including XML-formatted data, is provided below:

```
POST /phase_probability.php HTTP/1.1
Host: 192.168.23.126
Content-Type: Application/XML
Content-Length: 867
<?XML version="1.0" encoding="UTF-8"?>
<phase_probability>
<session_id> HUUUSDWE </session_id>
<timestamp> 2014-02-22 15:22:43</timestamp>
<model> probit regression </model>
<early>
    ...
    <prob> 0.112 </prob>
    <st_error> 0.00342 </st_error>
    ...
</early>
<mid>
    ...
    <prob> 0.612 </prob>
    <st_error> 0.00242 </st_error>
    ...
</mid>
<late>
    ...
    <prob> 0.012 </prob>
    <st_error> 0.00142 </st_error>
    ...
</late>
...
</phase_probability>
```

In one implementation, the SPC may retrieve the optimal portfolio for each business cycle phase, and generate a portfolio by combining the probability weighted optimal business cycle portfolios. As in the above example, the output portfolio would combine 0.112 of the optimal early cycle portfolio, 0.612 of the optimal mid cycle portfolio and 0.012 of the optimal late cycle portfolio, and/or the like. The combined seasonal portfolio 211 may be returned to the user.

In one implementation, the SPC server 220 may generate a portfolio record 212 to the SPC database 219. For example, an exemplary listing, written substantially in the form of PHP/SQL commands, to store the portfolio record 212 to the SPC database, is provided below:

```
<?PHP
header('Content-Type: text/plain');
...
// store input data in a database
mysql_connect("201.408.185.132",$SPC_server,$password); // access database
server
mysql_select("SPC_DB.SQL"); // select database to append
```

```
mysql_query("INSERT INTO PortfolioTable (timestamp,
portfolio_id,
    portfolio_name, portfolio_amount, portfolio_restriction,
    portfolio_user_setting, econ_cycle, portfolio_alloc, port-
        folio_return, . . . )
    VALUES ($timestamp, $portfolio_id, $portfolio_name,
$portfolio_amount,
    $portfolio_restriction, $portfolio_user_setting, $econ_
        cycle,
    $portfolio_alloc, $portfolio_return); // add data to Portfo-
        lioTable table in a SPC database
mysql_close("SPC_DB.SQL"); // close connection to
database
?>
```

Figure 3A:
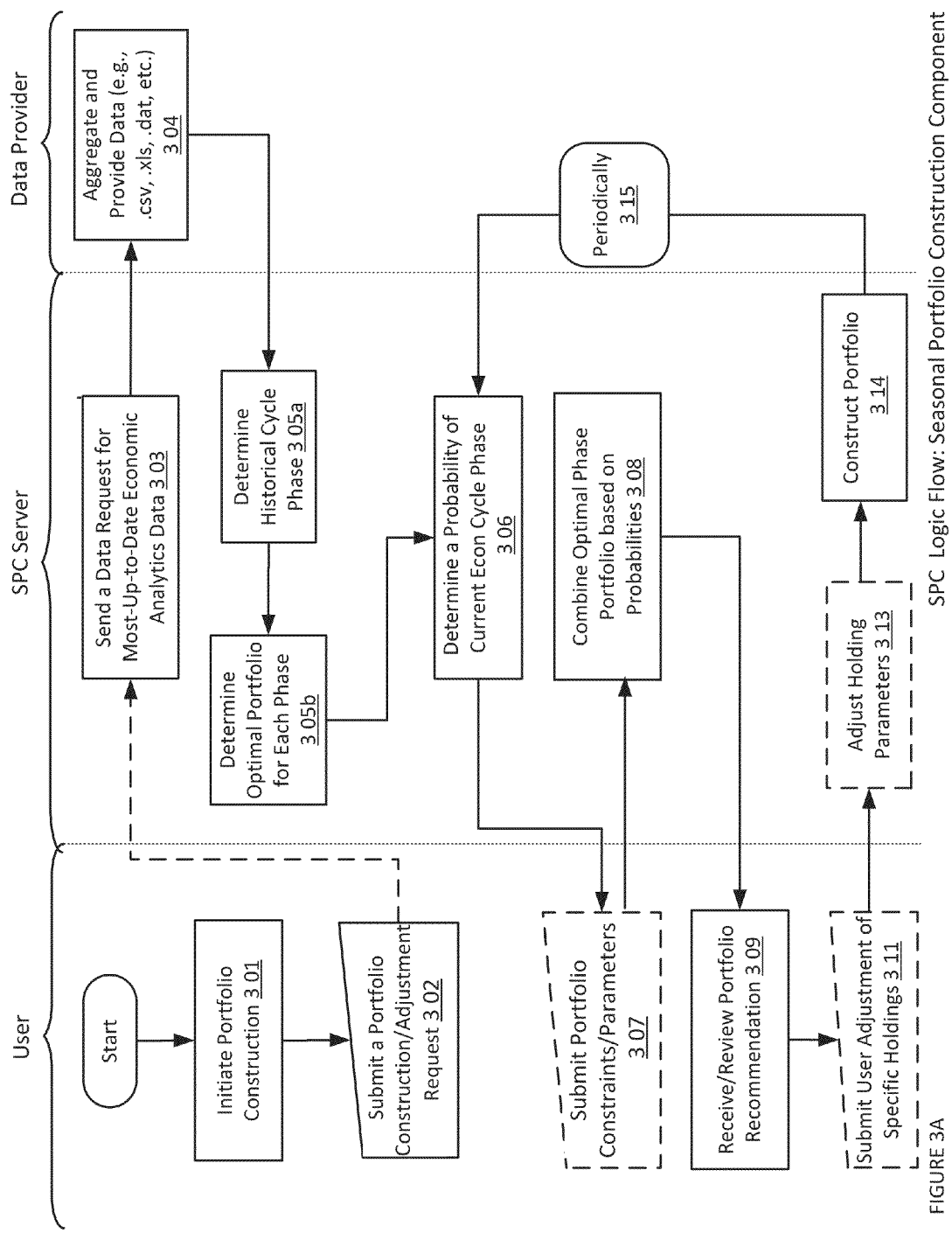

FIG. 3A provides an example logic flow diagram illustrating aspects of seasonal portfolio construction based on the phase of business and/or economic cycle within embodiments of the SPC. Within embodiments, a user (e.g., an investor, a portfolio manager, and/or the like) may initiate the portfolio construction 301, and submit a portfolio construction/adjustment request 302, e.g., to update the portfolio allocations to different constituents based on the current phase of the business and/or economy cycle. In one implementation, the user may optionally submit portfolio constraints and parameters 307. For example, the user may manually set rules on the investment allocation, such as but not limited to a maximum investment weight/ratio/percentage for a constituent, a maximum weight/ratio/percentage for a type of financial instrument, a maximum weight/ratio/percentage for an industrial sector, and/or the like.

In another implementation, the SPC server may update with a data provider (e.g., Bloomberg, etc.) constantly, periodically, intermittently, and/or on demand. For example, in one implementation, the SPC server may constantly, periodically, intermittently, and/or upon a user request, send a data request (e.g., see in FIG. 2) for the most-up-to-date economic analytics data 303 from a data provider, which may in turn aggregate and provide the economic data analytics 304 to the SPC server. For example, the economics analytics data may take a form similar to a spreadsheet in the format of ".csv," ".xls," ".dat" and/or the like, and may comprise statistical results generated from eViews, and/or the like. Economic data may include, but not limited to GDP, employment, income, credit, profits, policy, inventories, and/or the like.

In one implementation, upon receiving the most-up-to-date economic data analytics, the SPC server may determine analyze the data to "date" historical cycle phases 305a, e.g., to determine data characteristics associated with each cycle phase historically. In one implementation, the SPC may then determine an optimal investment portfolio for each cycle phase 305b, as further discussed in FIG. 4C.

In one implementation, the SPC may determine the current phase of the economic/business cycle 306, e.g., by determining a probability that the current business cycle may be associated with each cycle phase, early, mid, late or recession, etc. "date" the cycle, etc. Combining with the portfolio constraints/parameters that may be optionally submitted from the user 307, the SPC server may combine optimal portfolios associated with each cycle phase based on the probabilities that the current business cycle is associated with each phase 308. For example, in one implementation, the SPC server may maintain a list of securities, ETFs, bonds, and/or other investment instruments that generate an optimal investment combination suitable for a particular economic phase, and the SPC server may make the investment portfolio recommendation based on the economic phase. In one implementation, such optimal investment combination suitable for the particular economic phase may be obtained via historical performance analytics, e.g., see FIG. 4C.

In one implementation, the user may receive and review the provided portfolio recommendation 309, and may optionally submit a user selection of specific holdings 311 (or may alternatively accept the default settings from SPC). In one implementation, the SPC server may optionally adjust the holding parameters based on user preferences 313, e.g., the user configured parameters on investment allocation within a sector, an industry, a type of instrument, etc., and may construct the portfolio based on the parameters 314. In one implementation, the economic cycle phase "dating" and portfolio construction updating may occur periodically 315, and the SPC may rebalance the portfolio based osn the current phase of the economic/business cycle.

FIGS. 3B-3C provide exemplary logic flow diagrams illustrating aspects of determining a current phase in the economic/business cycle 306 within embodiments of the SPC. In one implementation, upon receiving the most-up-to-date economic data analytics from a data provider 305, the SPC may identify an economy/region of interest (e.g., a country, a geo-political district, and/or the like) 350, retrieve and analyze historical economic data 351 and the corresponding economic cycle phase 352, e.g., to establish a statistical structure describing the correlation between economic indicators and the economic cycle phase. Further discussions on the statistical structure are provided in FIGS. 4A-4B.

In one implementation, the SPC may may determine impactful factors for each economic phase 355 (e.g., recess/ early/mid/late phases may have representative impactful economic factors, see FIG. 4A, etc.). Exemplary asset classes may include, but not limited to equities, fixed income, real estate, currency, collectibles, derivatives, and/or the like. For example, for the recession phase, the exemplary impactful factors may include, but not limited to failing activity, drying credit, declining profits, easing policy, falling sales and inventory data, and/or the like. In one implementation, the SPC may obtain and collect data values of the corresponding data factors to transform data into usable factors for analysis 356, and instantiate a probit model to insert the factor data into the model 357. For example, the probit model may generate a normalized value that indicates a probability value that the current economy may be associated with a particular business cycle phase.

In one implementation, the SPC may obtain output form the probit model 358, e.g., coefficients of the regression model, and execute the probit model with the coefficients to generate forecast output values 359.

and normalize the output values to generate a probability value associated with an economic cycle phase 361. In one implementation, the SPC may determine the current economic cycle phase based on the probability value for each phases, e.g., recess, early, mid or late, etc. Further discussion of the probit model "dating" the current economic cycle phase is provided in FIGS. 4A-4B.

Continuing on with FIG. 3C, upon "dating" the economic/ business cycle phase in FIG. 3B, the SPC may construct and/or update the seasonal portfolio. In one implementation, the SPC may optionally obtain an asset class selection 365, e.g., an asset class that the user is interested in for investment portfolio construction, etc. Exemplary asset classes may include, but not limited to equities, fixed income, real estate, currency, collectibles, derivatives, and/or the like. In one implementation, the SPC may retrieve stock classification under the selected asset class selection, sector, and/or the like, and may determine whether any remap is necessary for the asset classes and/or stock classification 366. For example, the retrieved historical stock classification may be obsolete and the SPC may need to remap and apply the current structure to the past scheme to create the stock classification 367, e.g., responding to market index such as GICS, and/or the like.

In one implementation, the SPC may obtain historical returns for a selected asset class (e.g., monthly returns, etc.) for a specified time period 368a. Exemplary data sources may include, but not limited to S&P index for 20 years, analytics sources, Bloomberg feeds, and/or the like; such data may be imported into eViews, Microsoft Excel, and/or the like.

In one implementation, the SPC may optionally select asset classes with historically optimal performance 369, and test for discrimination in performance of asset classes across the early/mid/late/recess phases 370. For example, indicators employed for the discrimination testing may include, but not limited to random monthly difference, hit rate, average relative difference, and/or the like, 370b. In one implementation, the SPC may compare the difference of asset class performance in the four difference economic cycle phases. Exemplary discrimination testing procedures may include, but not limited to paired comparison, due-trio testing, triangle testing, ABX testing, duo-trio in constant reference models, and/or the like. For example, the discrimination testing may illustrate the major contributor for portfolio performance, e.g., 30% of the total return may come from equities asset class in the early cycle, etc.

In one implementation, the SPC may optimize the portfolio constituents with based on predefined portfolio constraints, e.g., the SPC may double the weights of equities in the early cycle as equities perform better at such phase of the economy, etc 371a. For example, the SPC may adopt different objectives when determining weights of different asset classes, such as but not limited to minimizing asset turnover, minimizing potential volatility, maximizing average returns, etc., 371b. Additionally, the SPC may have additional constraints for asset class weighting, e.g., a max-min approach that requiring no asset class holds more than 20% of the entire portfolio, etc.

In one implementation, the SPC may rebalance the portfolio based on the generated constituent weights 372, based on the weights determined at 371a. In one implementation, the SPC may periodically 373 update the portfolio.

FIGS. 4A-4B provide exemplary combined data and logic flow diagrams illustrating SPC regression engine providing the probit model to "dating" a current business/economic cycle phase (e.g., to determine a probability that the current cycle is within a particular business cycle phase, etc.) within embodiments of the SPC. In one implementation, the SPC may obtain input economic factors 402, such as, but not limited to diffusion index, GDP, sales and inventories, profits, credits, unemployment rate, and/or the like.

In one implementation, different economic phase may have different characteristics associated with the data factors 407. For example, during recession 410a, the SPC may employ factors such as, but not limited to diffusion index—recessionary indicators (e.g. consumer expectation on business and economic conditions, average workweek for manufacturing production workers, residential building permits, etc.), domestic economic activity (e.g. GDP), inventory cycle (e.g. new orders vs. inventories), profit cycle (e.g. productivity growth), credit cycle (e.g. leading credit index), and/or the like. During early cycle 410b, the SPC may employ factors such as, but not limited to diffusion index—early cycle indicators (e.g. productivity growth, initial jobless claims, etc.), domestic activity (e.g. state activity diffusion index), inventory cycle (e.g. inventory-to-sales ratio), profit cycle (e.g. cyclical productivity index), credit cycle (e.g. tightening of commercial & industrial loan standards), and/or the like. During mid cycle 410c, the SPC may employ factors such as, but not limited to diffusion index—mid cycle indicators (e.g. ISM manufacturing PMI, national activity index, etc.), domestic activity (e.g. industrial production), inventory cycle (e.g. manufacturing & trade sales and inventories), labor markets (e.g. personal incomes, payroll growth), credit cycle (e.g. financial stress index), and/or the like. For late cycle 410d, the SPC may employ factors such as, but not limited to diffusion index—late cycle indicators (e.g. labor market differential, composite leading index, etc.), domestic activity (e.g. transportation industrial production), inventory cycle (e.g. inventory-to-shipment ratio), profit cycle (e.g. corporate profit growth), credit cycle (e.g. slope of yield curve), and/or the like.

In one implementation, the SPC may invoke a probit regression structure 405a employing the input economic factors 402 to generate coefficients 206 for the factors 407. In one implementation, the SPC may generate normalized values as outputs 408 of the probit regression structure, e.g., representing a probability of the recession phase 410a, early cycle 410b, mid cycle 410c, and/or late cycle 410d.

With reference to FIG. 4B, the SPC may obtain historical data 411, including but not limited to the economic data factors 402 and the corresponding cycle phase, and/or the like. Different economic/business cycle phases may have different representative economic factors, and SPC may determine a group of impactful economic factors for each phase. For each factor and/or each cycle phase 412, the SPC may determine whether the particular cycle phase has a factor as a determining factor 413, and may then collect all determining factors for the cycle phase 415. In one implementation, the SPC may determine overlapped factors with a particular phase and eliminate the overlapped factor 416. The SPC may then store the factor as a determining factor for the particular cycle phase 417.

In one implementation, the SPC may instantiate a binary probit structure to obtain coefficients for regressors and obtain import current values of the factors into the structure to obtain a statistical measure (e.g., a probability that current business cycle phase is the particular cycle phase, etc.) for the factor 418.

For example, in one implementation, exemplary binary probit regression results employing various economic indicators as variables e.g., 407, and determining a probability that the current economic/business cycle phase is in an early cycle, may be provided as the following:

Dependent Variable: EARLY
Method: ML-Binary Probit (Quadratic hill climbing)
Time: 18:20
Sample (adjusted): 1957M03 2013M06
Included observations: 676 after adjustments
Convergence achieved after 4 iterations
QML (Huber/White) standard errors & covariance

| Variable | Coefficient | Std. Error | z-Statistic | Prob. |
|---|---|---|---|---|
| C | −1.529695 | 0.081831 | −18.69324 | 0.0000 |
| US_DFI_EARLY(−2) | 0.040949 | 0.003214 | 12.73944 | 0.0000 |
| McFadden R-squared | 0.388657 | Mean dependent var | | 0.213018 |
| S.D. dependent var | 0.409743 | S.E. of regression | | 0.306071 |

-continued

| | | | |
|---|---|---|---|
| Akaike info criterion | 0.639180 | Sum squared resid | 63.14015 |
| Schwarz criterion | 0.652542 | Log likelihood | −214.0429 |
| Hannan-Quinn criter. | 0.644353 | Deviance | 428.0858 |
| Restr. deviance | 700.2381 | Restr. log likelihood | −350.1191 |
| LR statistic | 272.1524 | Avg. log likelihood | −0.316631 |
| Prob(LR statistic) | 0.000000 | | |
| Obs with Dep = 0 | 532 | Total obs | 676 |
| Obs with Dep = 1 | 144 | | |

Dependent Variable: EARLY
Method: ML-Binary Probit (Quadratic hill climbing)
Time: 18:20
Sample (adjusted): 1965M08 2013M06
Included observations: 575 after adjustments
Convergence achieved after 4 iterations
QML (Huber/White) standard errors & covariance

| Variable | Coefficient | Std. Error | z-Statistic | Prob. |
|---|---|---|---|---|
| C | −1.014572 | 0.078233 | −12.96852 | 0.0000 |
| US_CYCPROD(−1) | 24.71008 | 2.665952 | 9.268762 | 0.0000 |
| McFadden R-squared | 0.291978 | Mean dependent var | | 0.201739 |
| S.D. dependent var | 0.401648 | S.E. of regression | | 0.318868 |
| Akaike info criterion | 0.718949 | Sum squared resid | | 58.26094 |
| Schwarz criterion | 0.734094 | Log likelihood | | −204.6978 |
| Hannan-Quinn criter. | 0.724856 | Deviance | | 409.3955 |
| Restr. deviance | 578.2245 | Restr. log likelihood | | −289.1123 |
| LR statistic | 168.8290 | Avg. log likelihood | | −0.355996 |
| Prob(LR statistic) | 0.000000 | | | |
| Obs with Dep = 0 | 459 | Total obs | | 575 |
| Obs with Dep = 1 | 116 | | | |

Dependent Variable: EARLY
Method: ML-Binary Probit (Quadratic hill climbing)
Time: 18:20
Sample (adjusted): 1967M03 2013M06
Included observations: 494 after adjustments
Convergence achieved after 4 iterations
QML (Huber/White) standard errors & covariance

| Variable | Coefficient | Std. Error | z-Statistic | Prob. |
|---|---|---|---|---|
| C | −2.254278 | 0.155594 | −14.48816 | 0.0000 |
| US_CONSRATIO(−1) | 0.987687 | 0.105585 | 9.354385 | 0.0000 |
| McFadden R-squared | 0.283253 | Mean dependent var | | 0.204453 |
| S.D. dependent var | 0.403710 | S.E. of regression | | 0.337233 |
| Akaike info criterion | 0.734183 | Sum squared resid | | 55.95314 |
| Schwarz criterion | 0.751197 | Log likelihood | | −179.3432 |
| Hannan-Quinn criter. | 0.740863 | Deviance | | 358.6864 |
| Restr. deviance | 500.4364 | Restr. log likelihood | | −250.2182 |
| LR statistic | 141.7500 | Avg. log likelihood | | −0.363043 |
| Prob(LR statistic) | 0.000000 | | | |
| Obs with Dep = 0 | 393 | Total obs | | 494 |
| Obs with Dep = 1 | 101 | | | |

Dependent Variable: EARLY
Method: ML-Binary Probit (Quadratic hill climbing)
Time: 18:20
Sample (adjusted): 1968M06 2013M06
Included observations: 541 after adjustments
Convergence achieved after 5 iterations
QML (Huber/White) standard errors & covariance

| Variable | Coefficient | Std. Error | z-Statistic | Prob. |
|---|---|---|---|---|
| C | −2.189391 | 0.182681 | −11.98476 | 0.0000 |
| BOFGX(−1) | 0.033204 | 0.003540 | 9.379791 | 0.0000 |
| McFadden R-squared | 0.247576 | Mean dependent var | | 0.214418 |
| S.D. dependent var | 0.410798 | S.E. of regression | | 0.353472 |
| Akaike info criterion | 0.789540 | Sum squared resid | | 67.34417 |
| Schwarz criterion | 0.805413 | Log likelihood | | −211.5707 |
| Hannan-Quinn criter. | 0.795747 | Deviance | | 423.1413 |
| Restr. deviance | 562.3709 | Restr. log likelihood | | −281.1855 |
| LR statistic | 139.2296 | Avg. log likelihood | | −0.391073 |
| Prob(LR statistic) | 0.000000 | | | |
| Obs with Dep = 0 | 425 | Total obs | 541 | |
| Obs with Dep = 1 | 116 | | | |

In one implementation, upon obtaining the coefficients, the SPC may obtain the current values of the determining factors in the regression model 419, and import the data values into a probit structure to calculate a normalized value (e.g., a probability value, etc.) 421. Such normalized value may be obtained as a probability that the current cycle phase is associated with the particular cycle phase 428.

In one implementation, the SPC may determine whether the four cycle phases have been iterated 433, and may then repeat 413-428 for every cycle phase, e.g., early, mid, late and recession, so that the SPC may obtain a probability of each cycle phase for the current cycle phase.

FIG. 4C provides an example logic flow diagram illustrating generating an optimal portfolio for a cycle phase (e.g., 205) within embodiments of the SPC. Within implementations, the SPC may launch an optimizer 430, which may incorporate historical data such as, but not limited to benchmark 431a, available asset list 431b, quadratic penalty (e.g., penalty functions, etc.) 431c, portfolio constraints 431d (e.g., user preferences on one or more asset classes, etc.), asset constraints 431e (e.g., user preferences on a maximum/minimum weight of an asset class, etc.), and/or the like.

In one implementation, the optimizer 430 may employ a normalized expected asset return (e.g., per cycle phase, early, mid, late or recession) objective 432, and the optimizer 430 may in turn maximize the return while minimizing a risk 433 to generate optimal asset weights for an expected portfolio (e.g., per cycle phase, early, mid, late and recession).

Figure 5B:
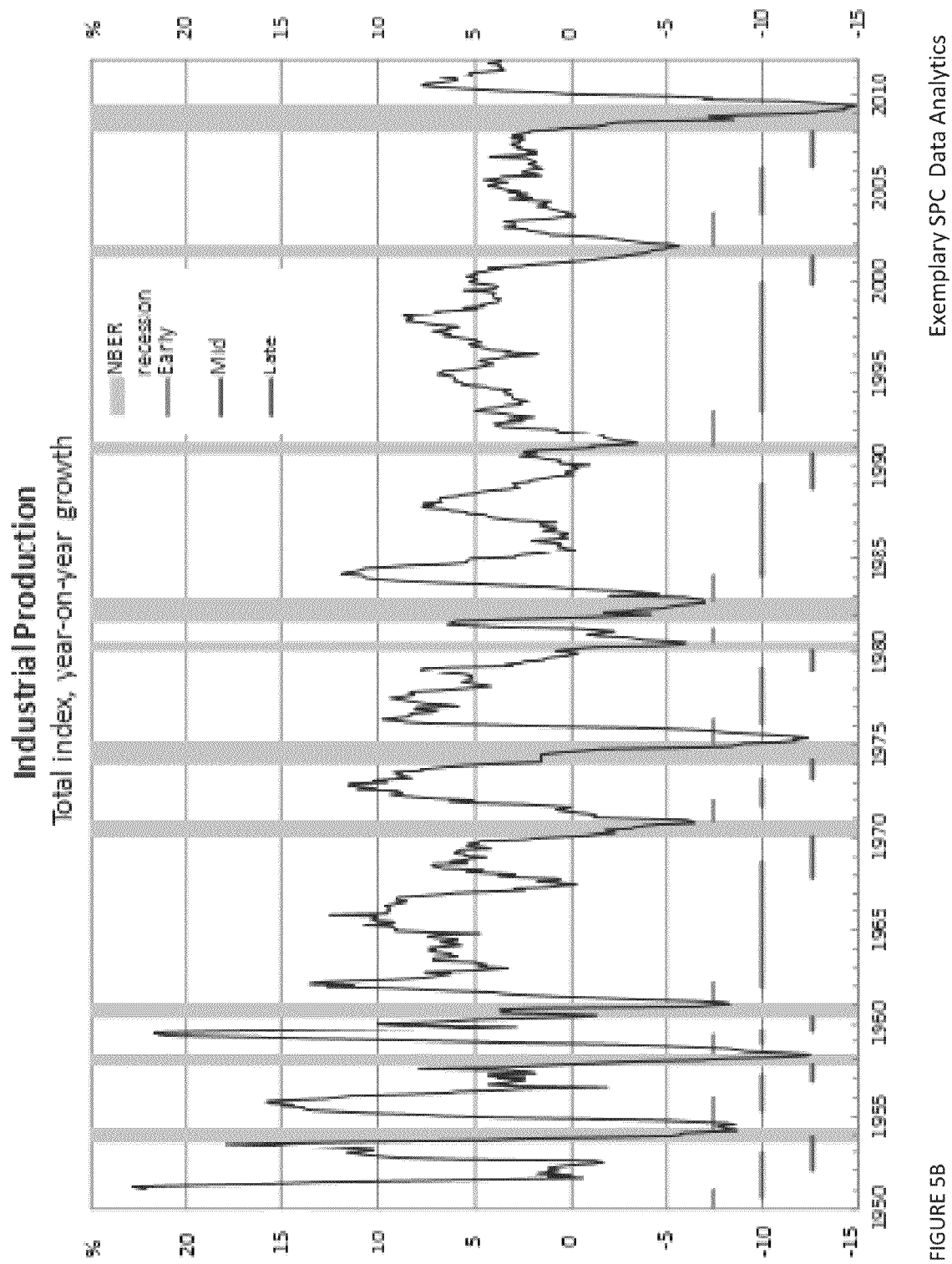

FIGS. 5A-5G provide exemplary data analytics charts illustrating various economic indicators within embodiments of the SPC. Within embodiments, FIG. 5A provides an illustration of four different business cycle phases as discussed in FIG. 1B.

FIG. 5B illustrates industrial production to proxy current activity, wherein the transition from early to contraction occurs as production first increases at an increasing then decreasing rate, and subsequently decreases at a decreasing then increasing rate.

Figure 5C:
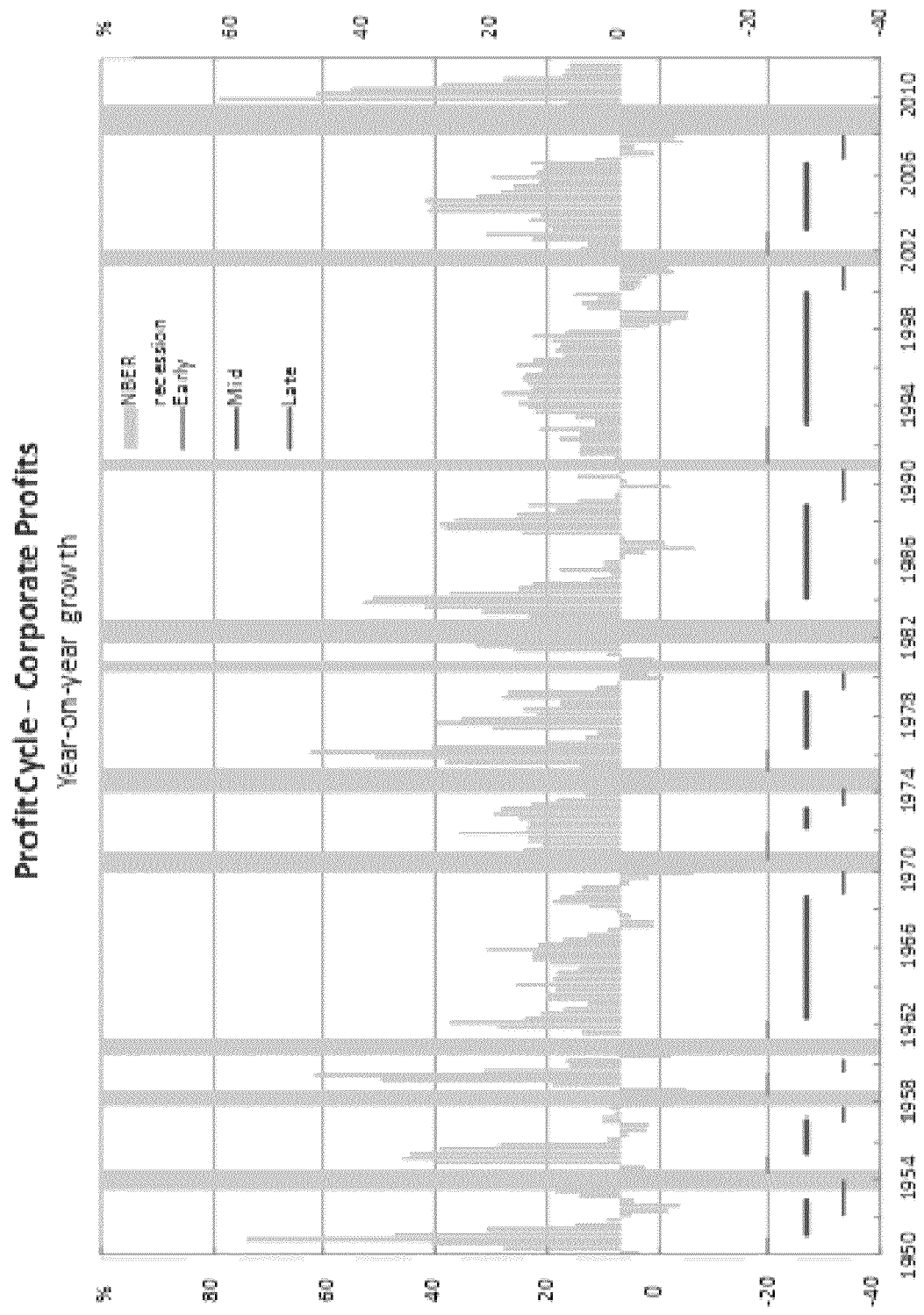

FIG. 5C illustrates corporate profits growth, which capture important information about demand and production and changes in margins. The early phase is dated when profits rebound sharply due to dramatic margin expansion as sales pick up and capacity remains lean. The mid cycle sees stable margins and profit growth, while late cycle sees margins and profits coming under pressure.

Figure 5D:
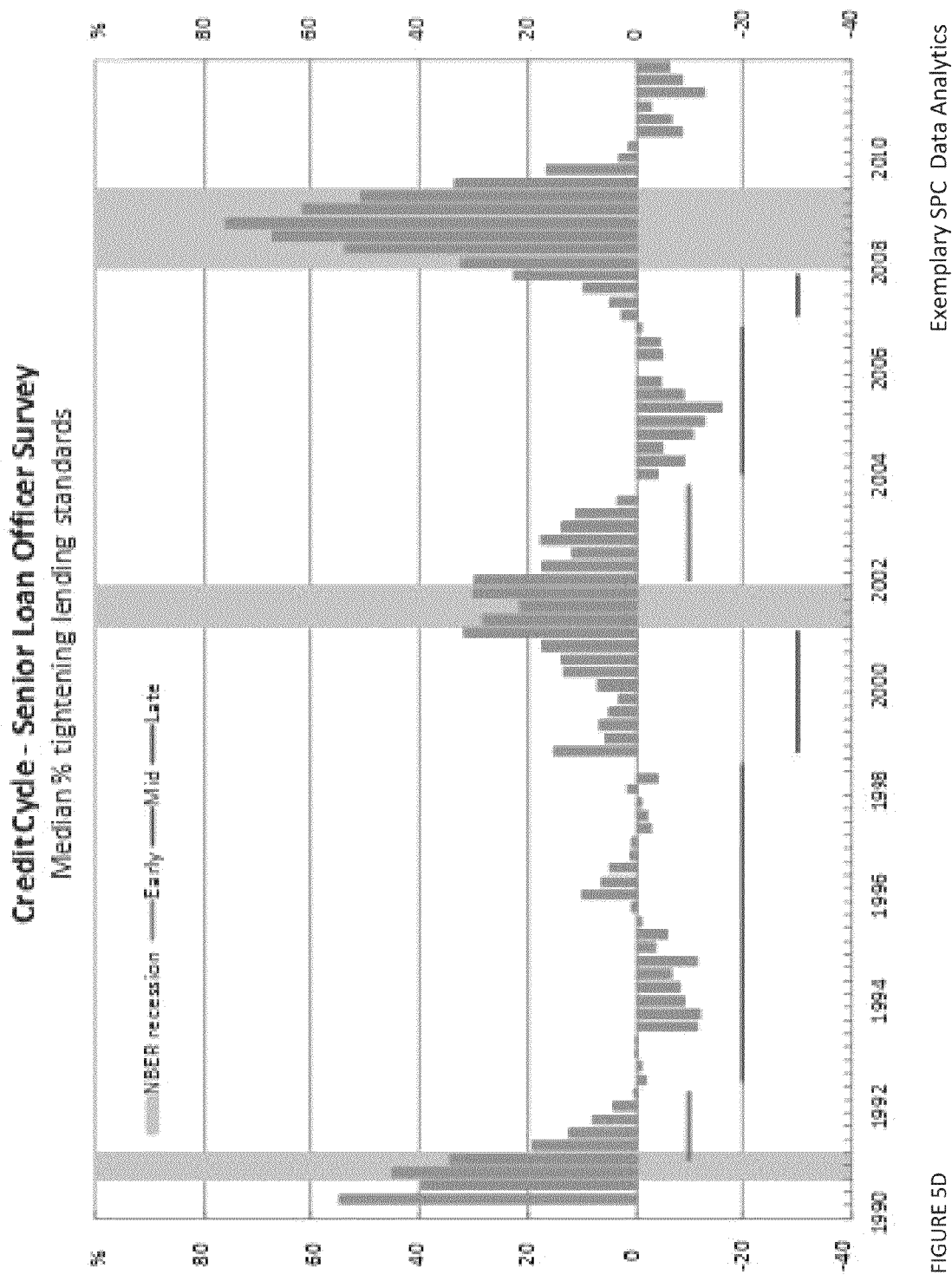

FIG. 5D illustrates credit growth, wherein the extension of credit may be important to both households and business, underpinning their ability to consume and invest. In one implementation, in the early cycle, banks may become less tight after strict credit rationing in the recession; the mid cycle sees banks on net easing lending conditions, spurring borrowing and spending; and during the late cycle, the economy overheats and banks once again may restrain credit by tightening standards.

Figure 5E:
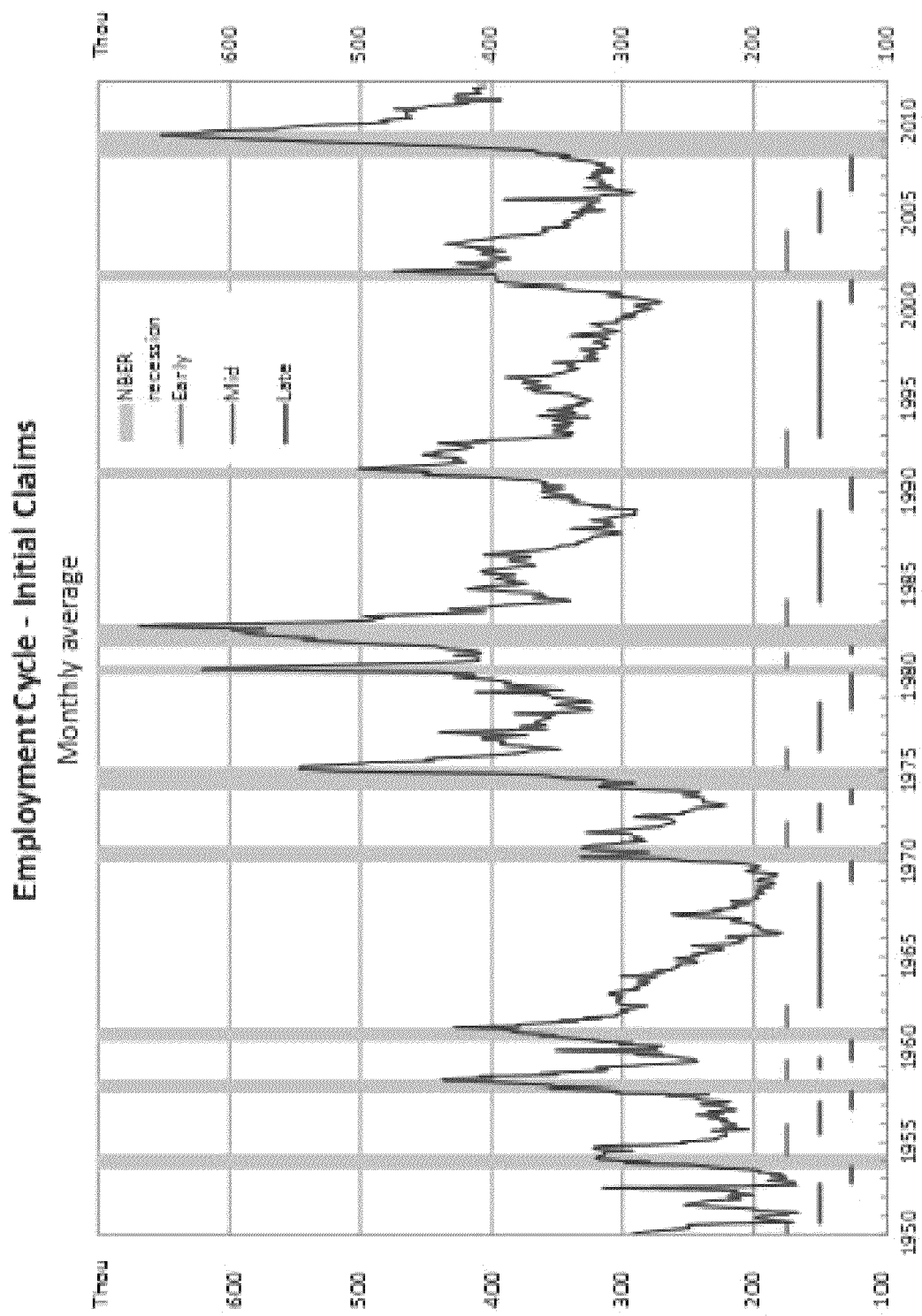
Figure 5F:
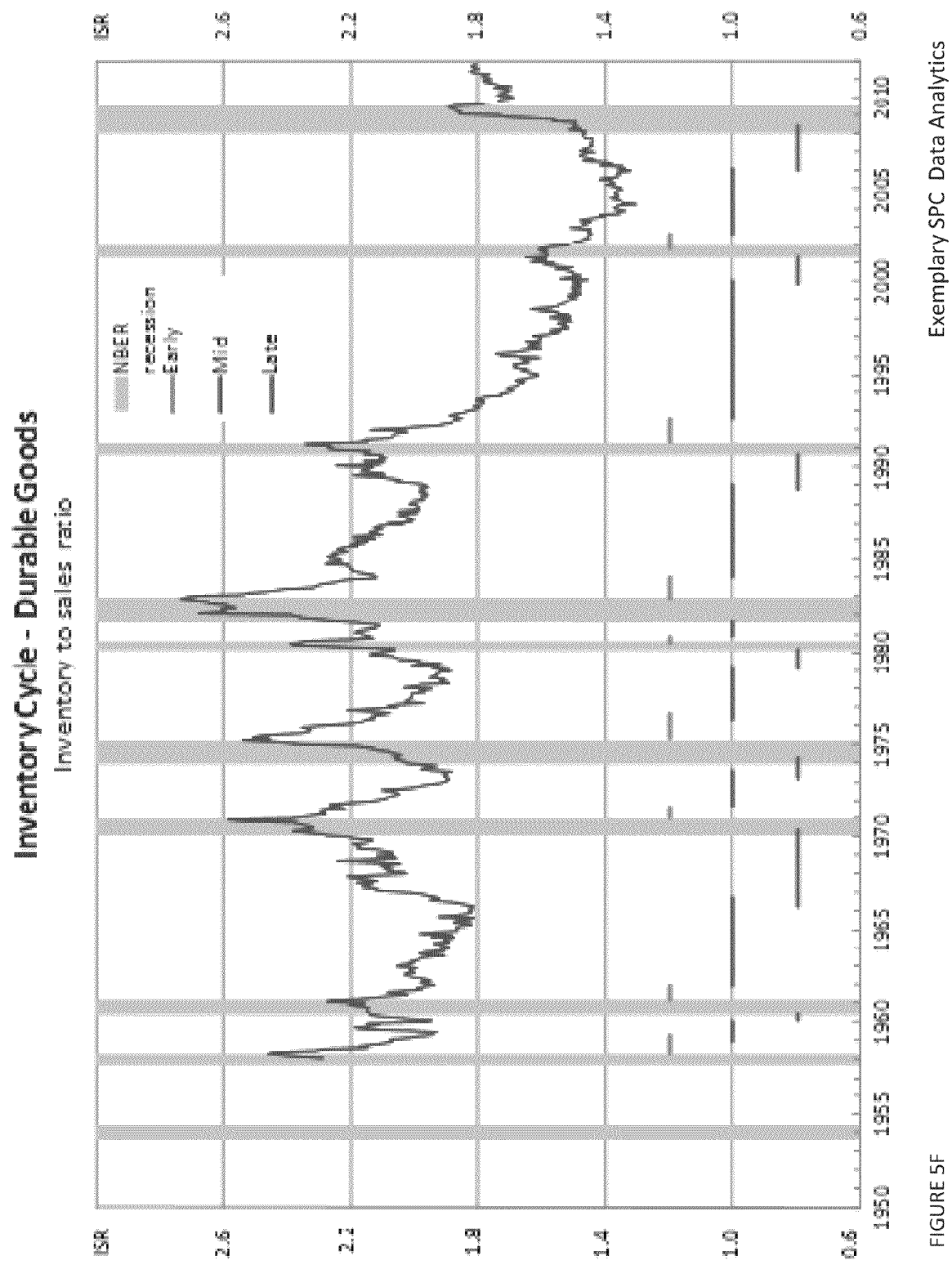

FIG. 5E illustrates employment growth, wherein jobs drive household incomes and consumption, the latter comprising the largest share of the U.S. economy. In one implementation, initial claims as a timely indicator of the labor market, unaffected by the level of participation which can distort the unemployment rate. The early cycle occurs when claims fall sharply from the peak in the later part of the recession, as businesses cease massive retrenchment. In mid cycle, claims follow a gradual downward trajectory, which may nevertheless be interrupted by short-lived upticks. Claims bottom in late cycle, before making a decided leg-up into the next contraction FIG. 5F illustrates inventory cycle. In one implementation, inventories, like profits, reveal much about demand and production. We look at durable goods to better gauge cyclical fluctuations, and date the early cycle when the inventory-to-sales ratio falls steeply. For example, The ISR drifts lower in mid cycle even as both sales and inventories grow. The ISR may begin to climb in late cycle, as sales wane but producers are slow to react so inventories accumulate unintentionally.

Figure 5G:
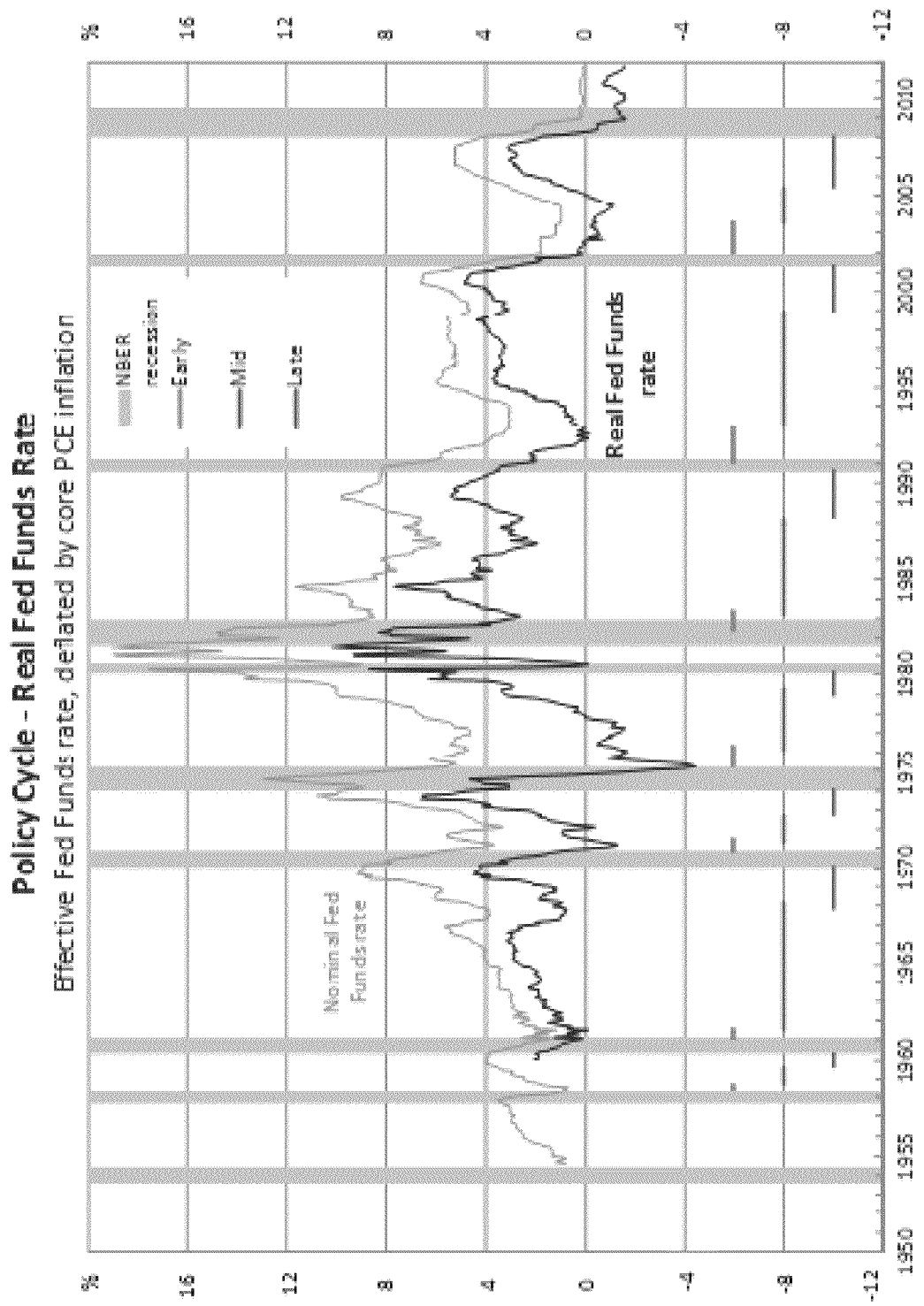

FIG. 5G illustrates policy change cycle. For example, as shown in FIG. 5G, since the Great Depression, activist monetary policy has been a constant feature of the macroeconomy, whereby authorities may react to past, current or forecast developments in the economic environment. In one implementation, the Fed Funds rate deflated with core PCE inflation may be employed to determine the policy stance—assuming the Fed follows a real interest rate rule, because it is the expected path of the real rate that affects economic decisions.

In one implementation, the early cycle may be typical when the target policy rate is slashed and real rates are negative to provide stimulus to the economy. In the mid cycle, policy may be more steady, remaining stimulatory (or is beginning to normalize) and real rates are around their average levels. In late cycle, policy is tight and real rates are restrictive. Often the Fed begins to cut rates heading into a recession, but may be too late to avert it.

FIGS. 6A-6G provide exemplary data analytics charts illustrating economic indicators of mid-cycle within embodiments of the SPC. In one implementation, the SPC may identify, retrospectively, the three expansion phases of a typical U.S. business cycle as early, mid and late, using a set of censoring rules on five indicators that reflect the fundamental cyclical dynamics. Economic indicators to analyze the economic/business cycle may include, but not limited to corporate profits, credit, employment, inventories, and monetary policy (e.g., see FIG. 5A). In one implementation, the SPC may build quantitative models to determine the likelihood of being in each phase at a particular point in time. While these business cycle models are designed to give a reading on the current state of the economy, in contrast to the recession probability model which has a short lead of three months, studies show that there is a high degree of persistence in the underlying economic cycle so that today's state contains a lot of information about the course of the economy in the future.

Figure 6A:
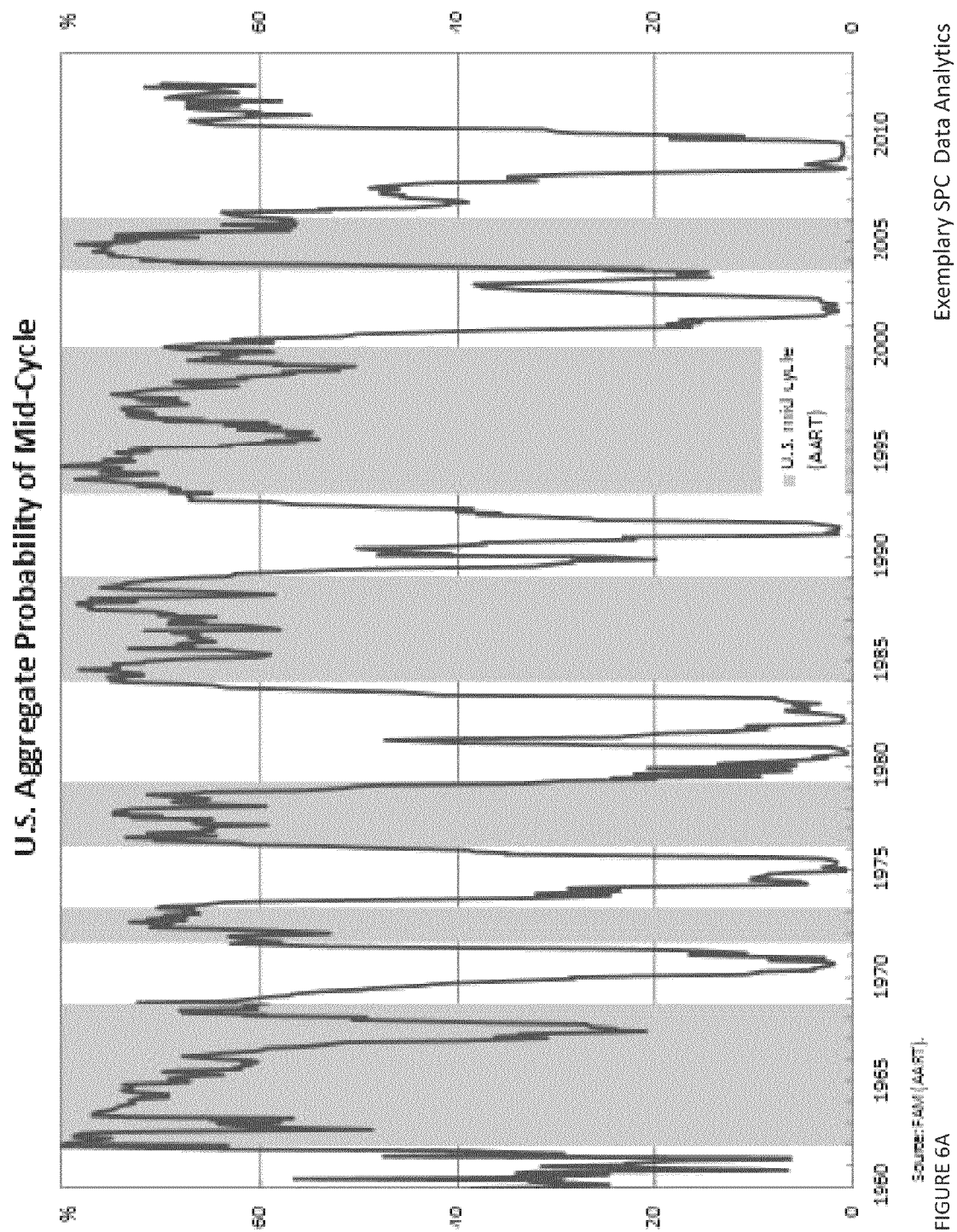
FIGS. 6A-6G provide exemplary data analytics charts illustrating economic indicators of mid-cycle within embodiments of the SPC.

With reference to FIG. 6A, as the economy may spend most of its time in the mid cycle, where the strength of the expansion gains traction and is widespread. Production may grow at a steady pace, supported by solid demand, and the economy is consistently adding jobs. The monetary policy stance is also accommodative. So the choice of mid-cycle indicators captures broad-based improvement as well as stability in overall macroeconomic conditions, across sectors and markets, at the national and regional levels. In one implementation, the broad sweep of available indicators may point to a high probability of the U.S. being in mid cycle (e.g., see FIG. 6A).

Figure 6B:
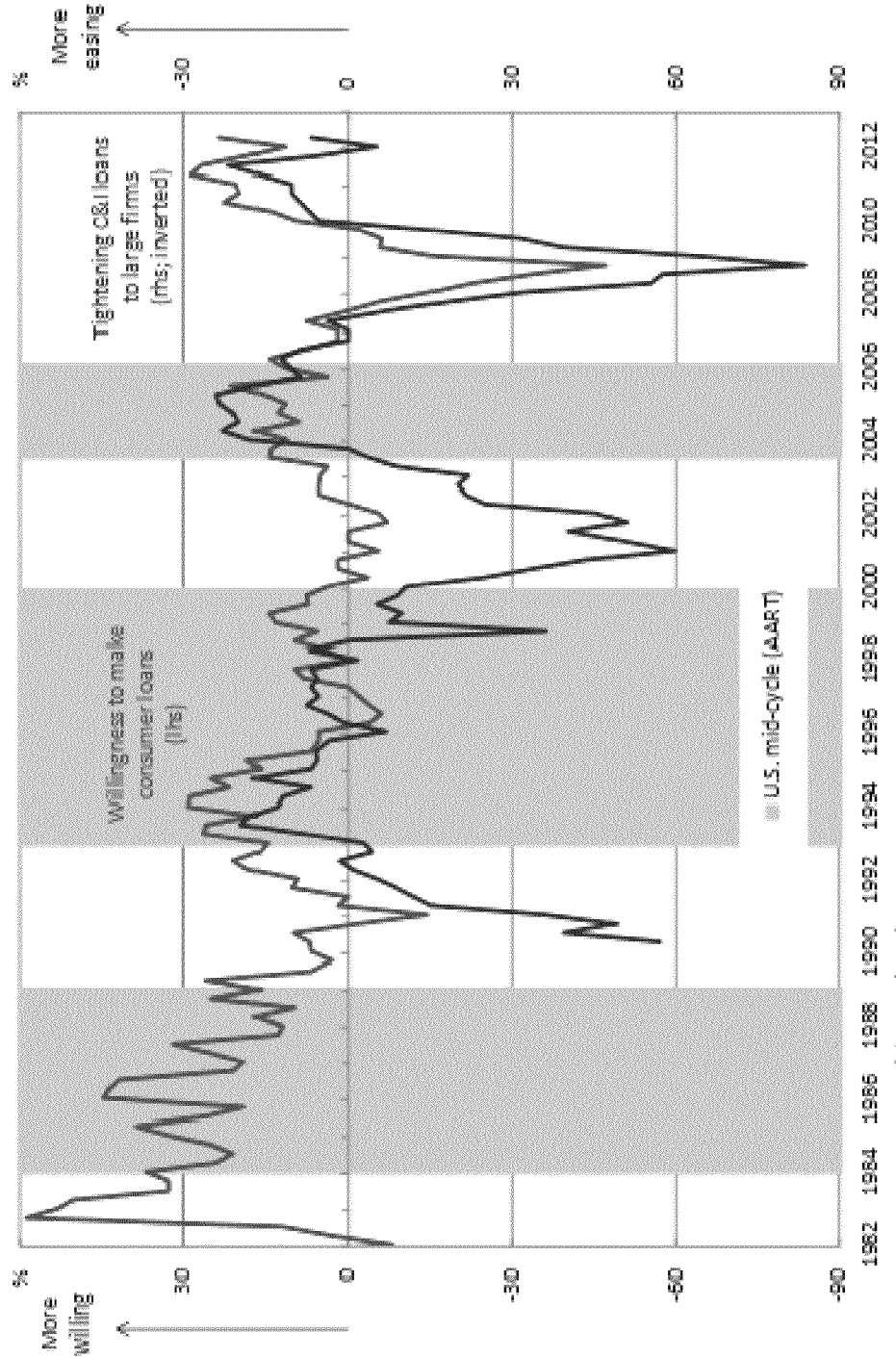

In one implementation, a typical feature of the mid cycle is easing lending conditions which underpin steady credit growth, e.g., see FIG. 6B. When credit flows, the economy usually grows. The Fed's Senior Loan Officer Survey suggests that banks are on net still easing—though not as aggressively as they do in early cycle—which is generally consistent with the economy being in a state of expansion.

Figure 6C:
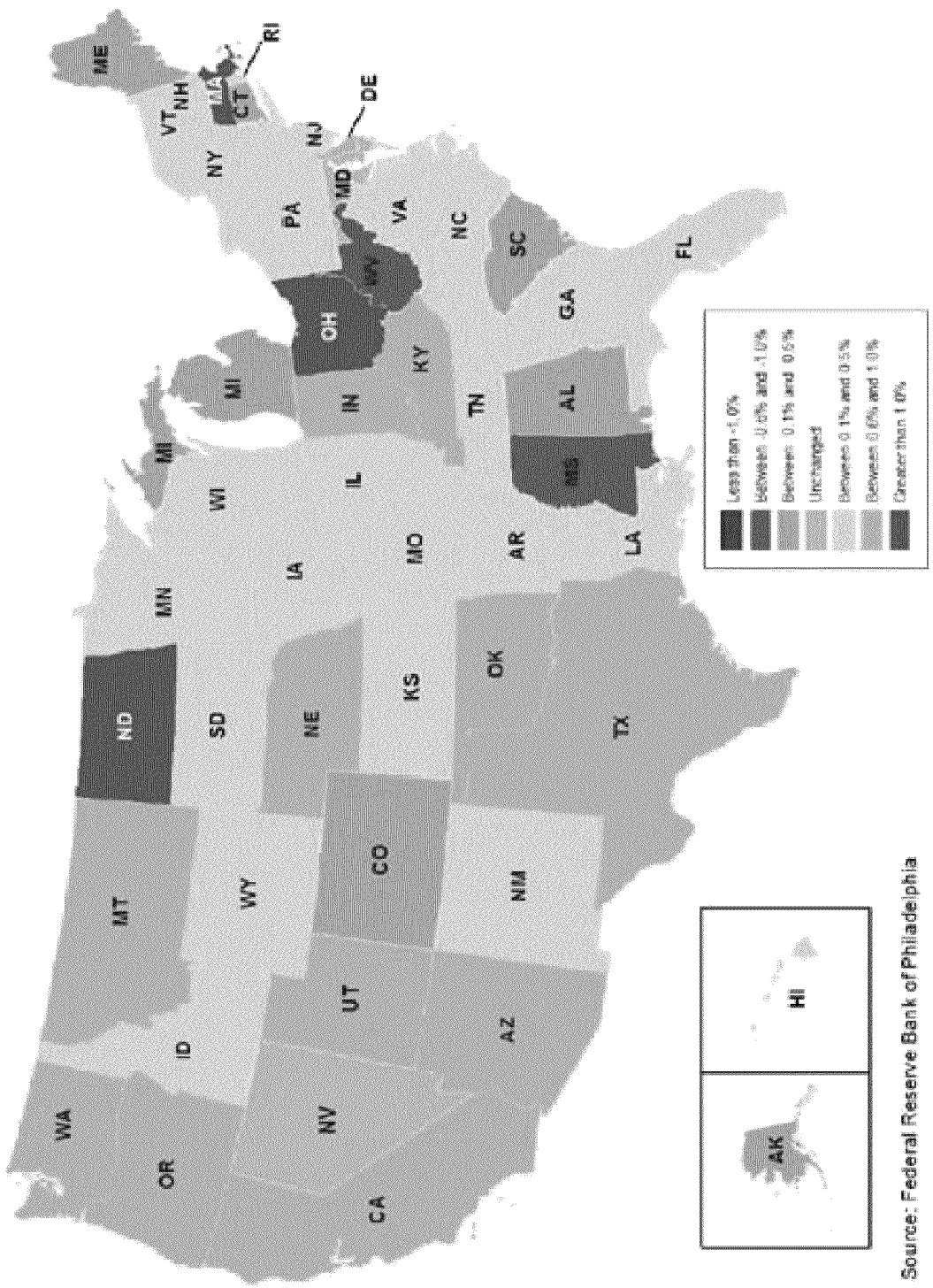

In another implementation, FIG. 6C shows indicators of state-level activity suggest that improvement is widespread geographically, with the majority of states seeing gains over a 3-month period in employment, production and real earnings. This may be typical of an economic expansion that is fairly entrenched. Looking ahead, localised weakness may become evident in areas adversely affected by drought conditions.

Figure 6D:
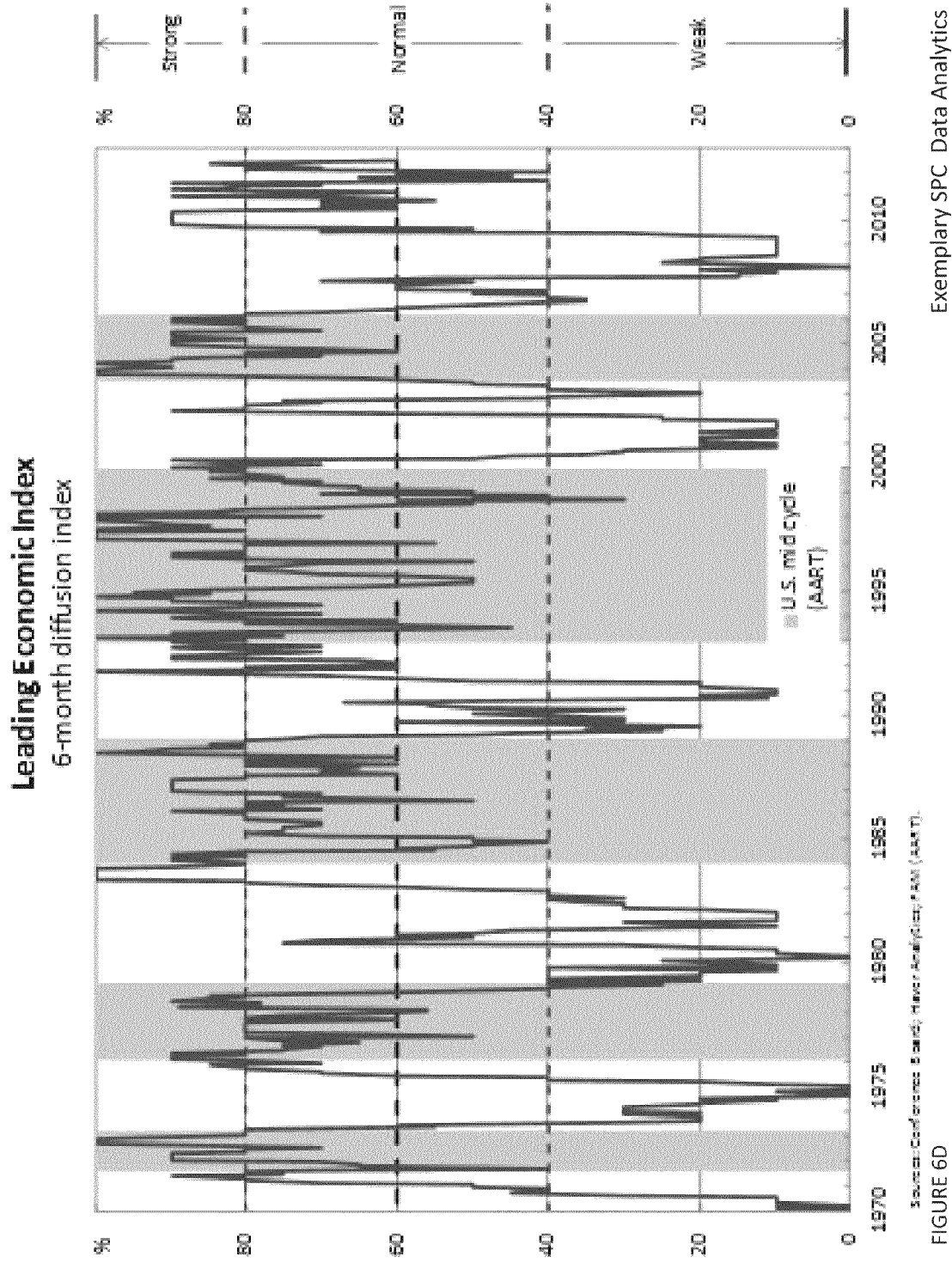

As shown in FIG. 6D, there have also been generally more strengths than weaknesses across the different parts of the economy since the beginning of the year, particularly in housing and to a lesser extent employment (e.g., see FIG. 6D).

Figure 6E:
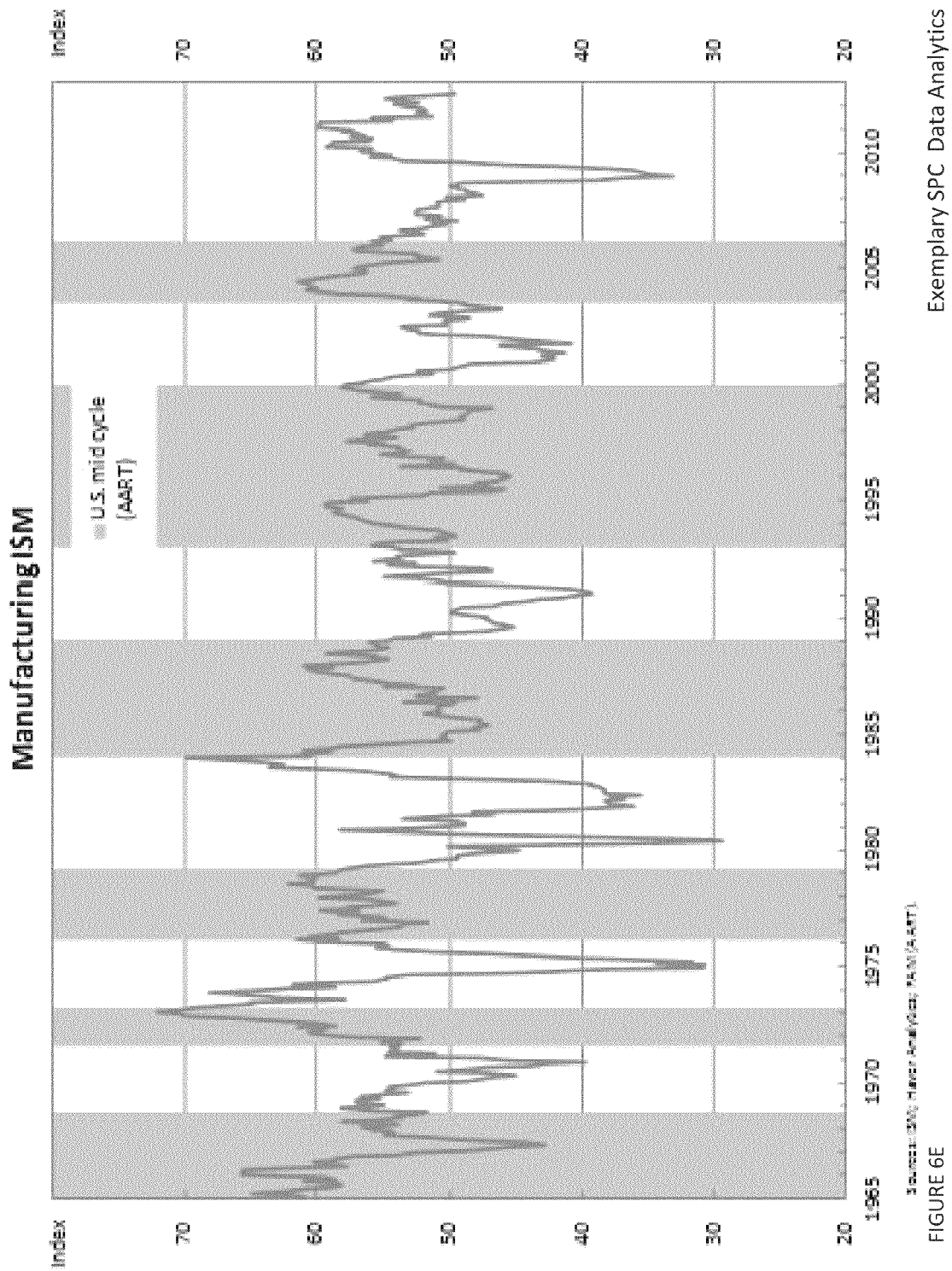
Figure 6F:
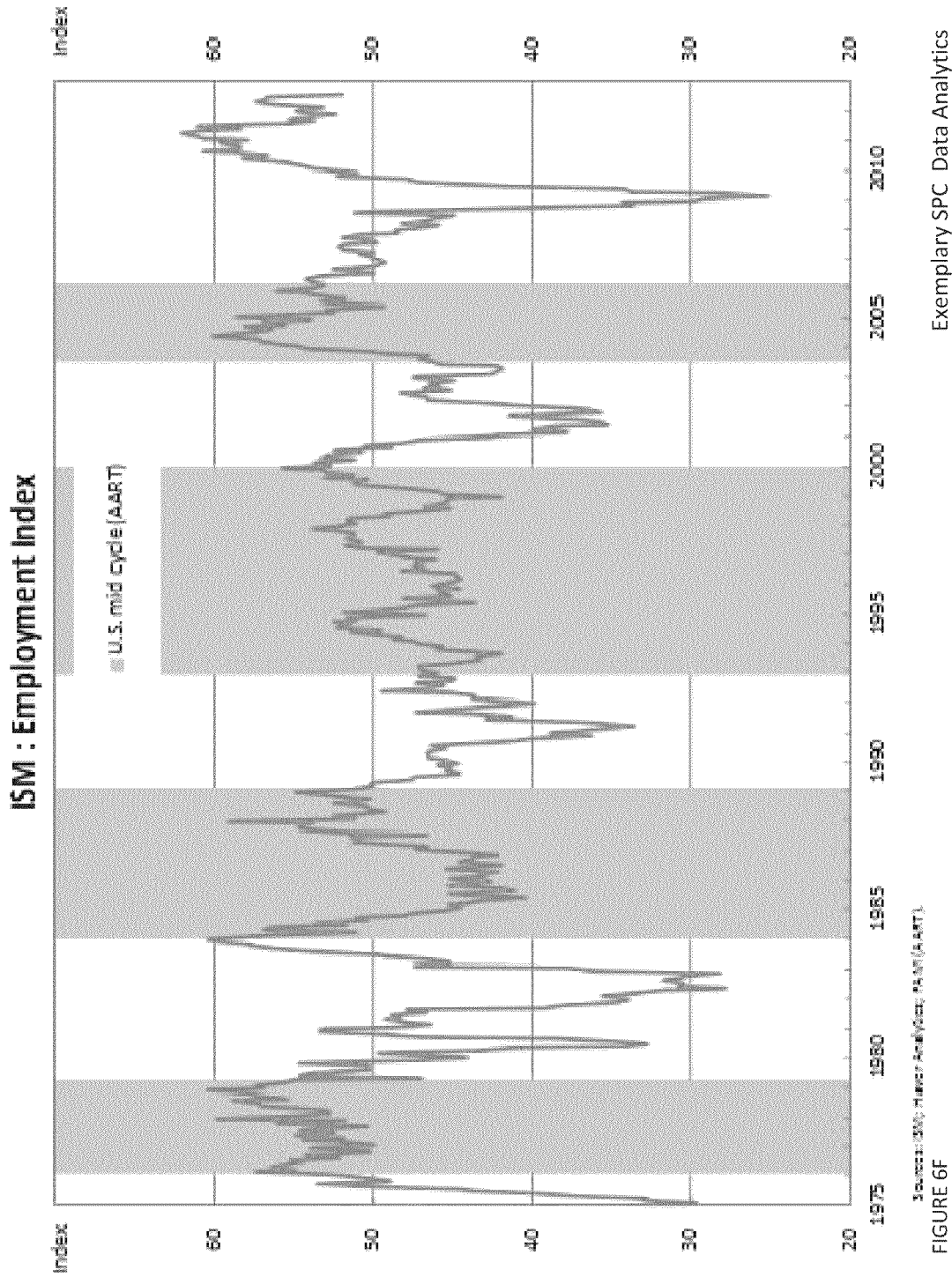

As shown in FIGS. 6E-F, some forward-looking indicators may have softened, especially in the industrial sector (e.g., FIGS. 6E-F).

Figure 6G:
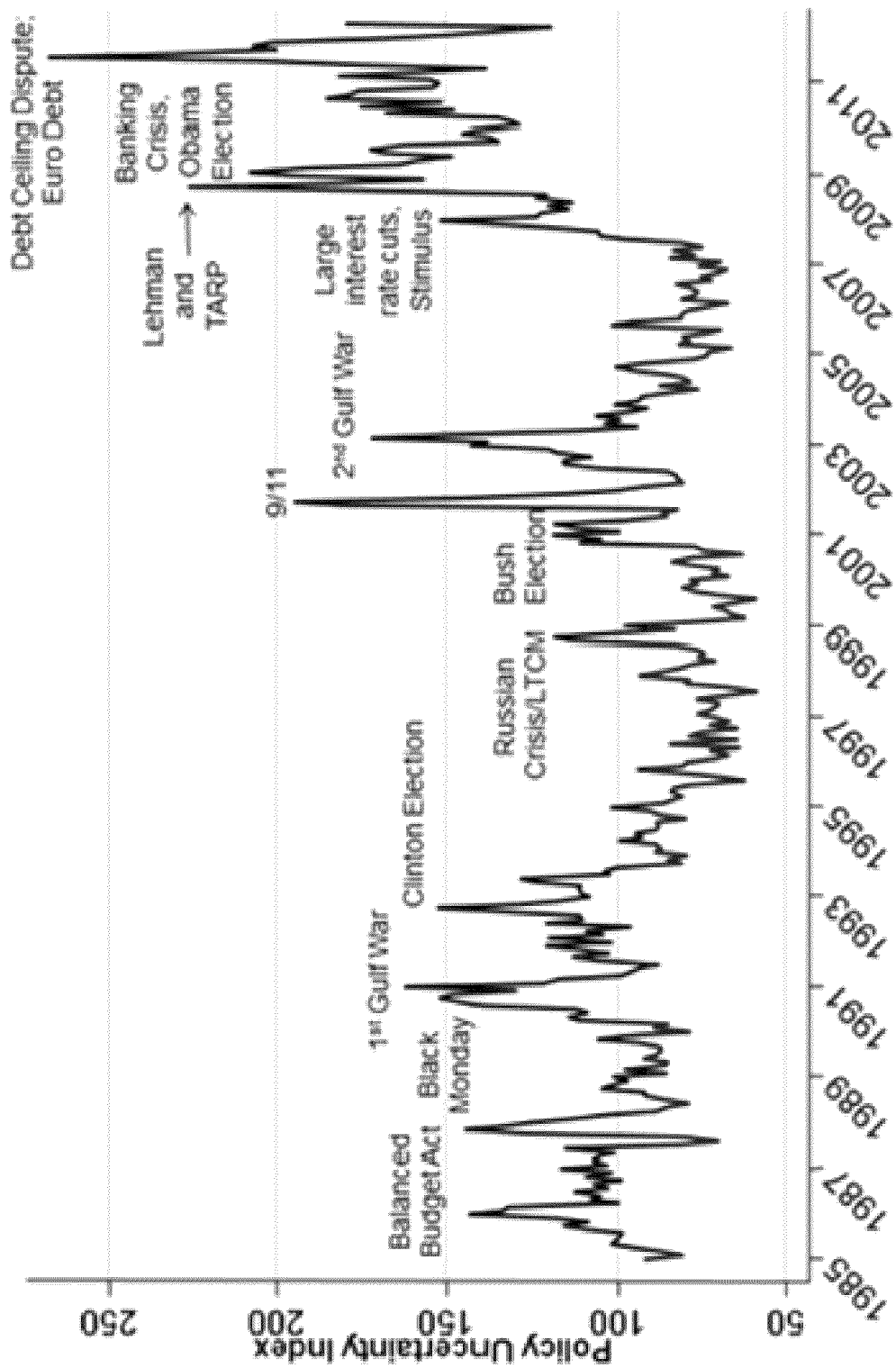

With reference to FIG. 6G, a large part of the current soft-patch is undoubtedly related to policy uncertainty, already high relative to history, and likely to intensify. When the second half of the year unfolds and lack of clarity persists on the fiscal cliff, households and businesses may increasingly behave with caution, affecting their spending, investment and hiring decisions. So while the deterioration in macro indicators is not at odds with previous mid-cycle slowdowns, the extreme policy risks, the subdued global outlook, and fragile sentiment raises the risks of a significantly worse outcome for the final months of the year.

Figure 7A:
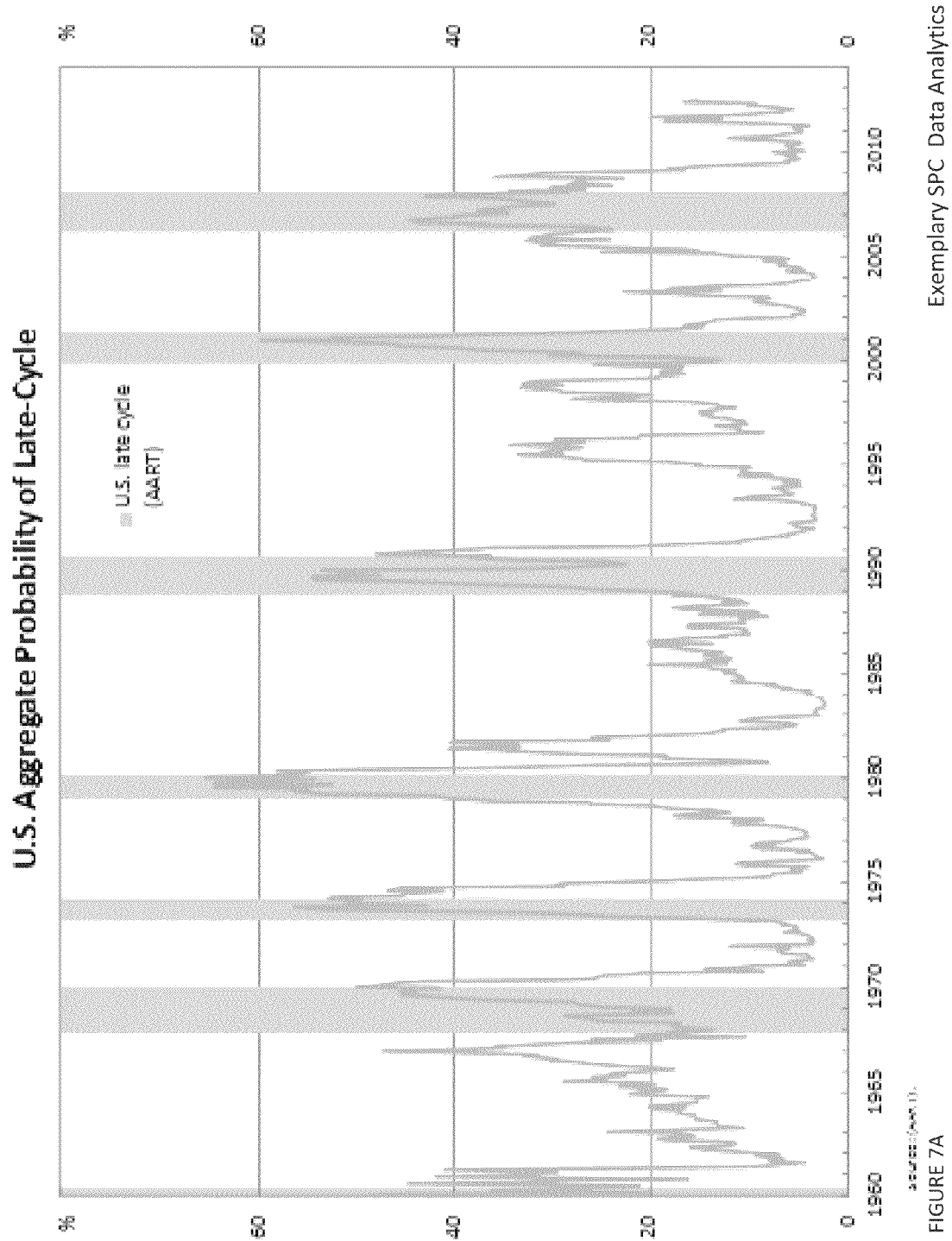
FIGS. 7A-7D provide exemplary data analytics charts illustrating economic indicators of late-cycle within embodiments of the SPC.

FIGS. 7A-7D provide exemplary data analytics charts illustrating economic indicators of late-cycle within embodiments of the SPC. With reference to FIG. 7A, The late cycle is usually the most difficult phase to model, as it tends to occur because of an exogenous shock, or the gradual building up of pressures from capacity constraints, policy tightening, asset bubbles, and other imbalances. The probability of the U.S. entering the late cycle has ticked up in recent months is provided in FIG. 7A.

Figure 7B:
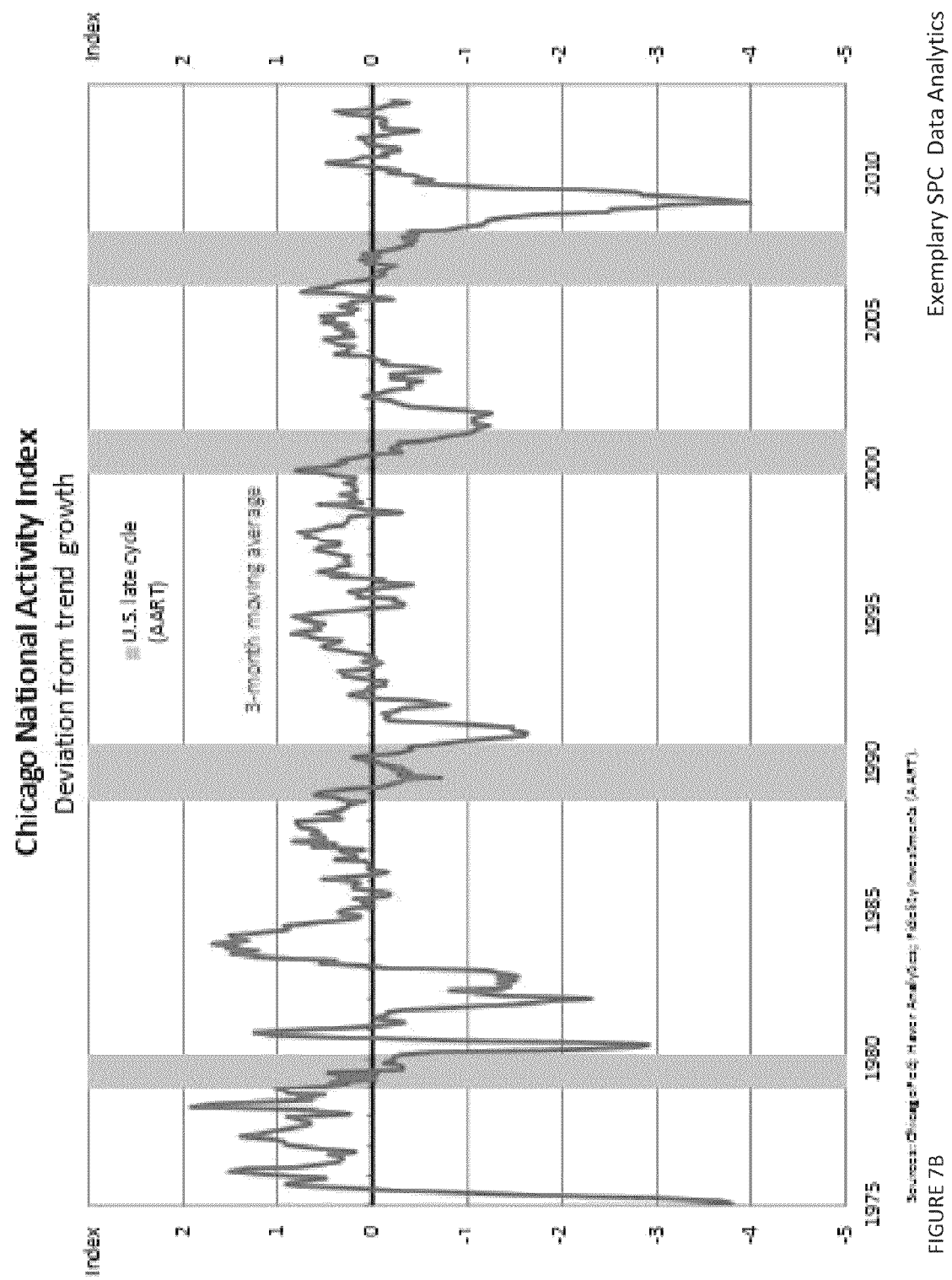

As shown in FIG. 7B, momentum across a broad range of data may appear to have eased recently. For example, the Chicago Fed National Index—which captures indicators from production and income, to consumption and housing—may point to some loss in momentum (e.g., see FIG. 7B).

In one implementation, the current slowdown is on a similar scale to that which occurred in the middle of 2011, but the downside risks have mounted. In addition to domestic policy risks there are external risks from an escalation of the ongoing European crisis and a further weakening of the Chinese economy. In one implementation, it is likely that the softness in activity, including the declines in new orders, is a symptom of precautionary behavior as a result of heightened uncertainty over the near-term domestic and global outlook.

Figure 7C:
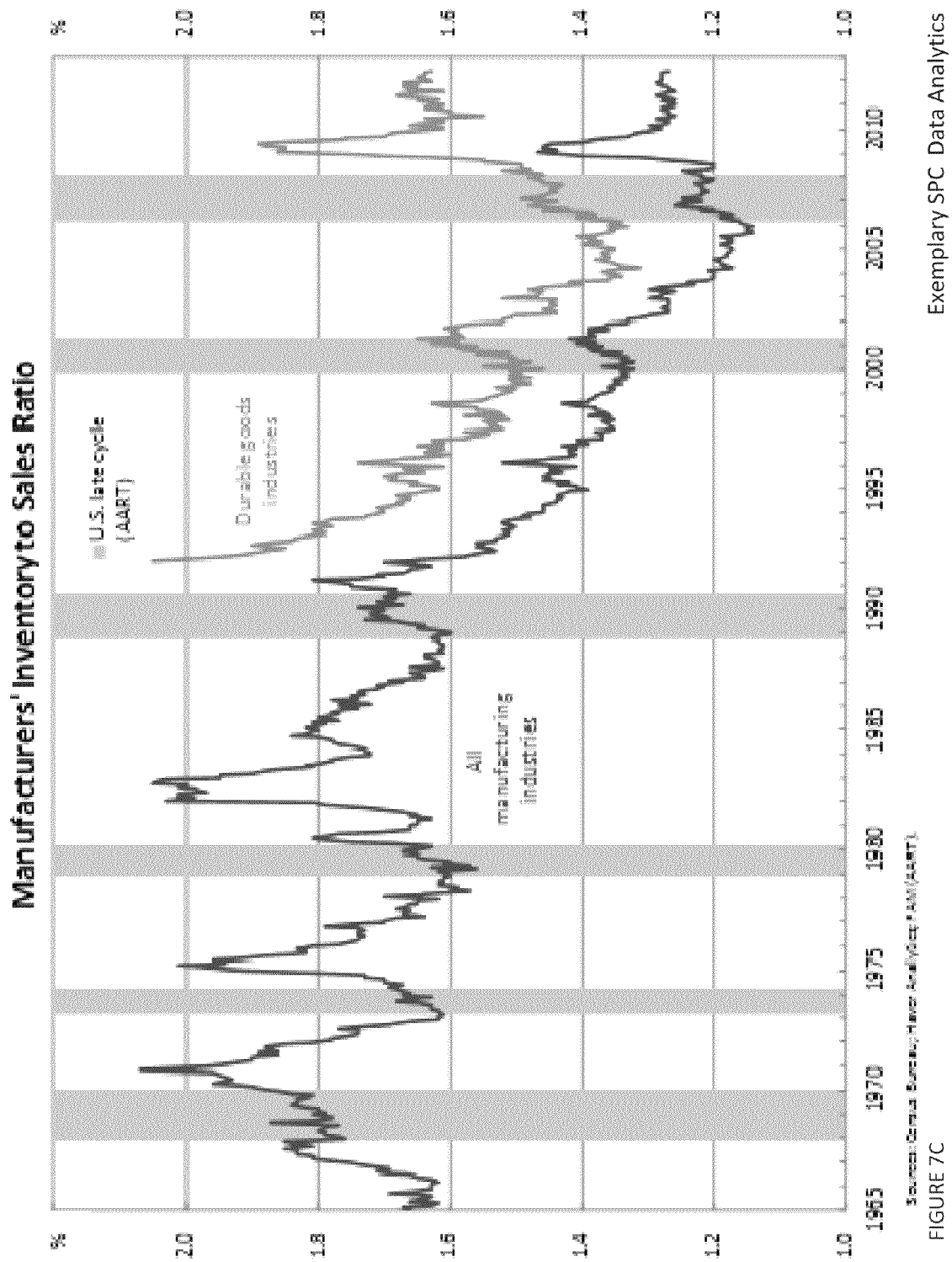
Figure 7D:
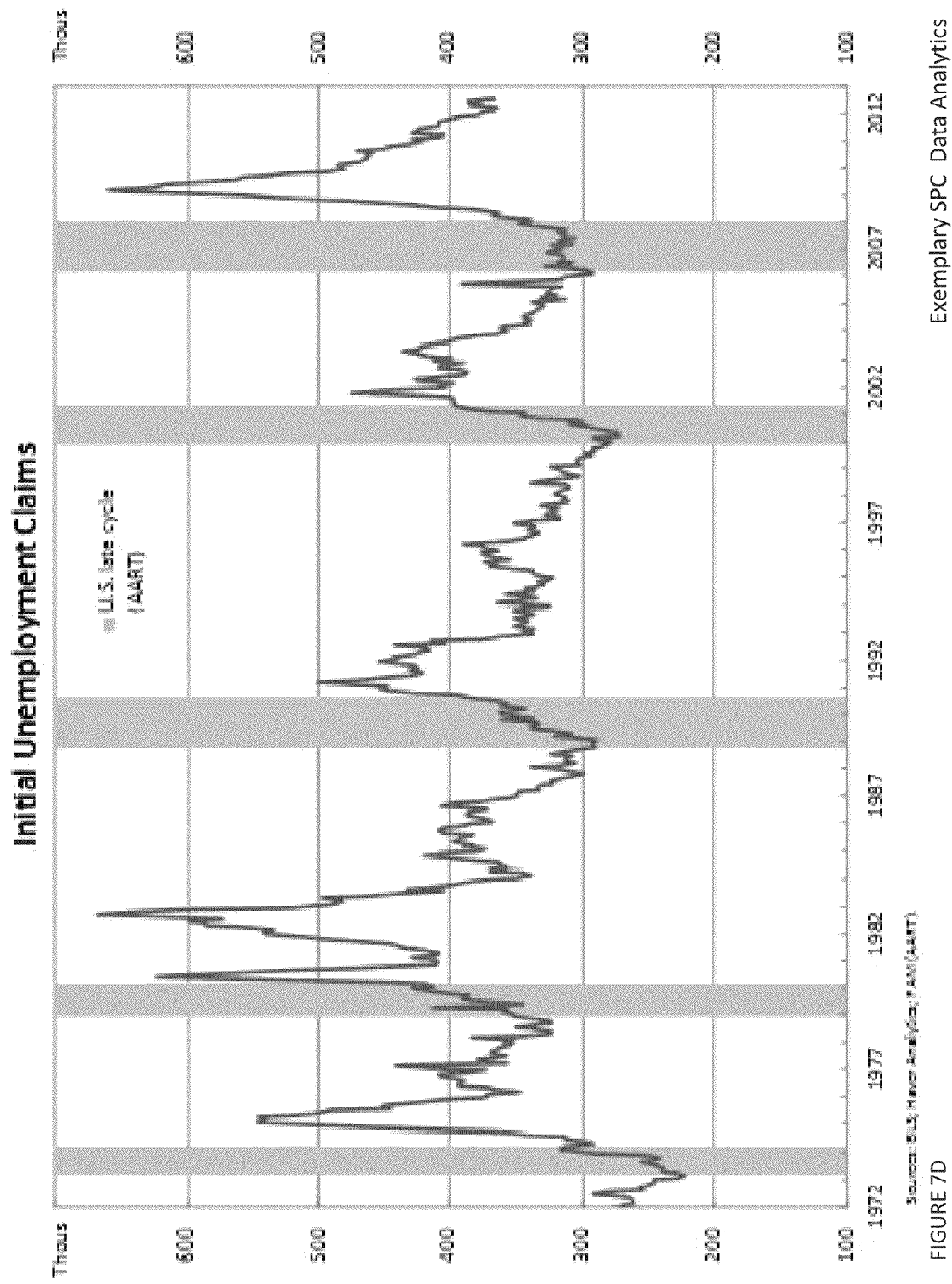

Returning to the fundamental dynamics of a mid cycle, overall inventory levels remain well contained. And initial unemployment claims seems to have resumed a downward trend (FIGS. 7C-D). Lending and monetary conditions may also remain supportive (FIG. 6F).

Figure 8A:
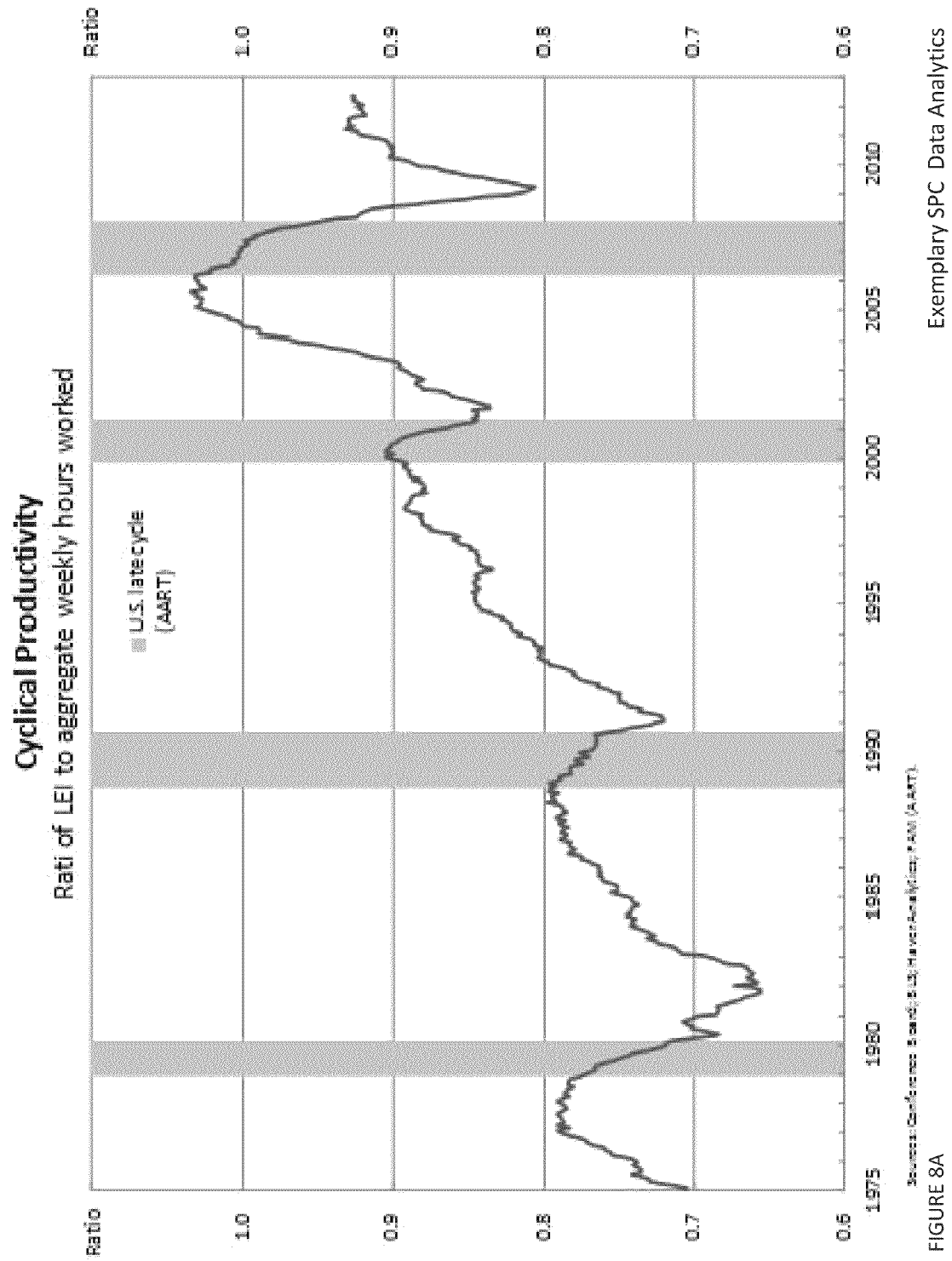
FIGS. 8A-8E provide exemplary historical data analytics charts illustrating economic indicators of early-cycle within embodiments of the SPC.

With reference to FIG. 8A, the quantitative and qualitative analysis may suggest that the U.S. economy is not yet in late cycle, but may be on the cusp. Reflecting this, our measure of 'cyclical productivity'—the ratio of the Leading Economic Indicator to aggregate weekly hours worked—appears to have plateaued (e.g., see FIG. 8A). This has tended to precede the late cycle because when firms cannot extract further productivity gains to increase production, they need to hire more workers. This eventually puts upward pressures on wages and underlying inflation—one of the defining characteristics of late cycle.

Figure 8B:
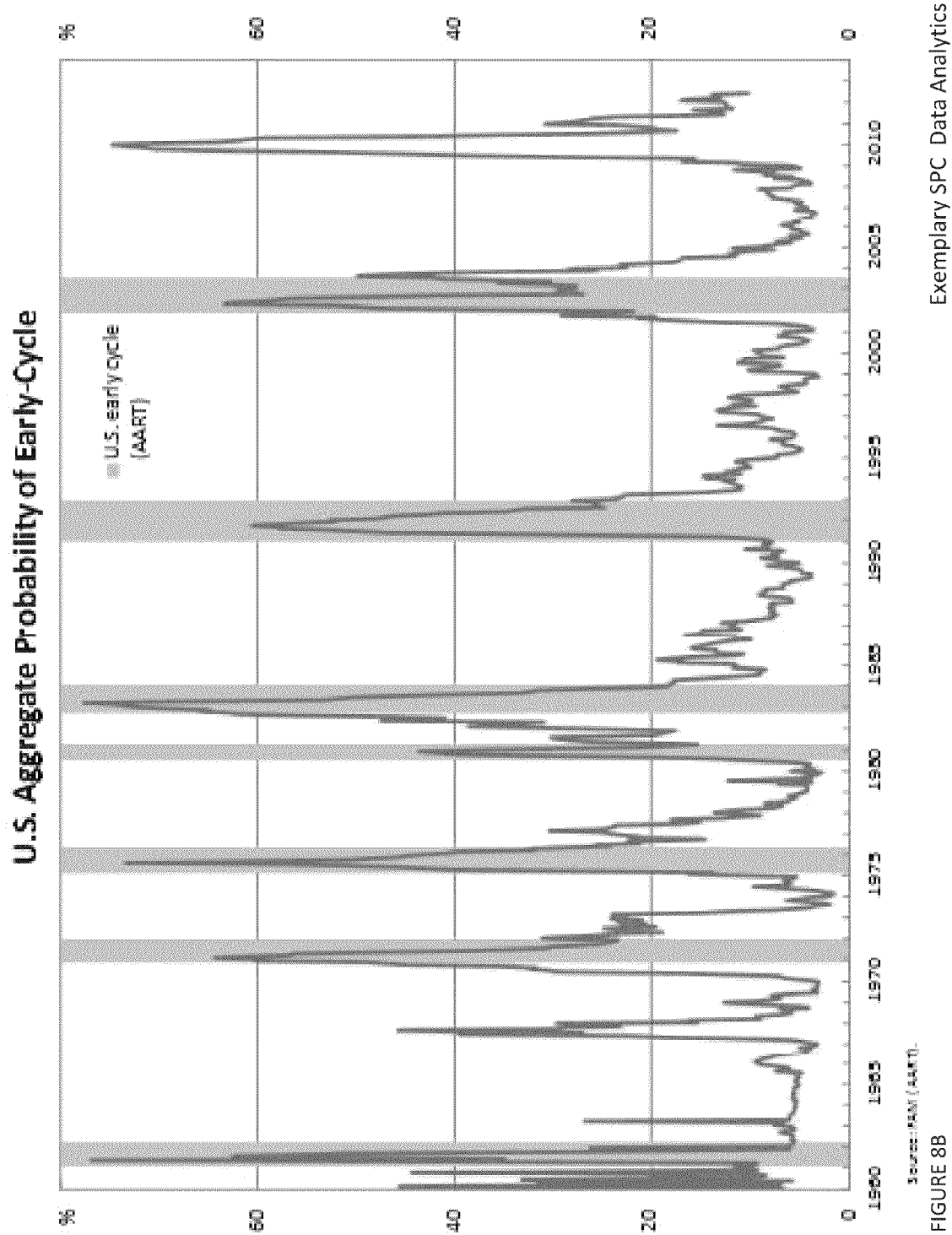

FIGS. 8B-8E provide exemplary historical data analytics charts illustrating economic indicators of early-cycle within embodiments of the SPC. With reference to FIG. 8B, the early phase of the recovery out of recession is one of the shortest phases of the business cycle, and tends to occur when policy stimulus kicks in and pent up demand boils over. It appears that the early phase of the current cycle began in the first months of 2009 and ended in mid-2010 (e.g., see FIG. 8B).

Figure 8C:
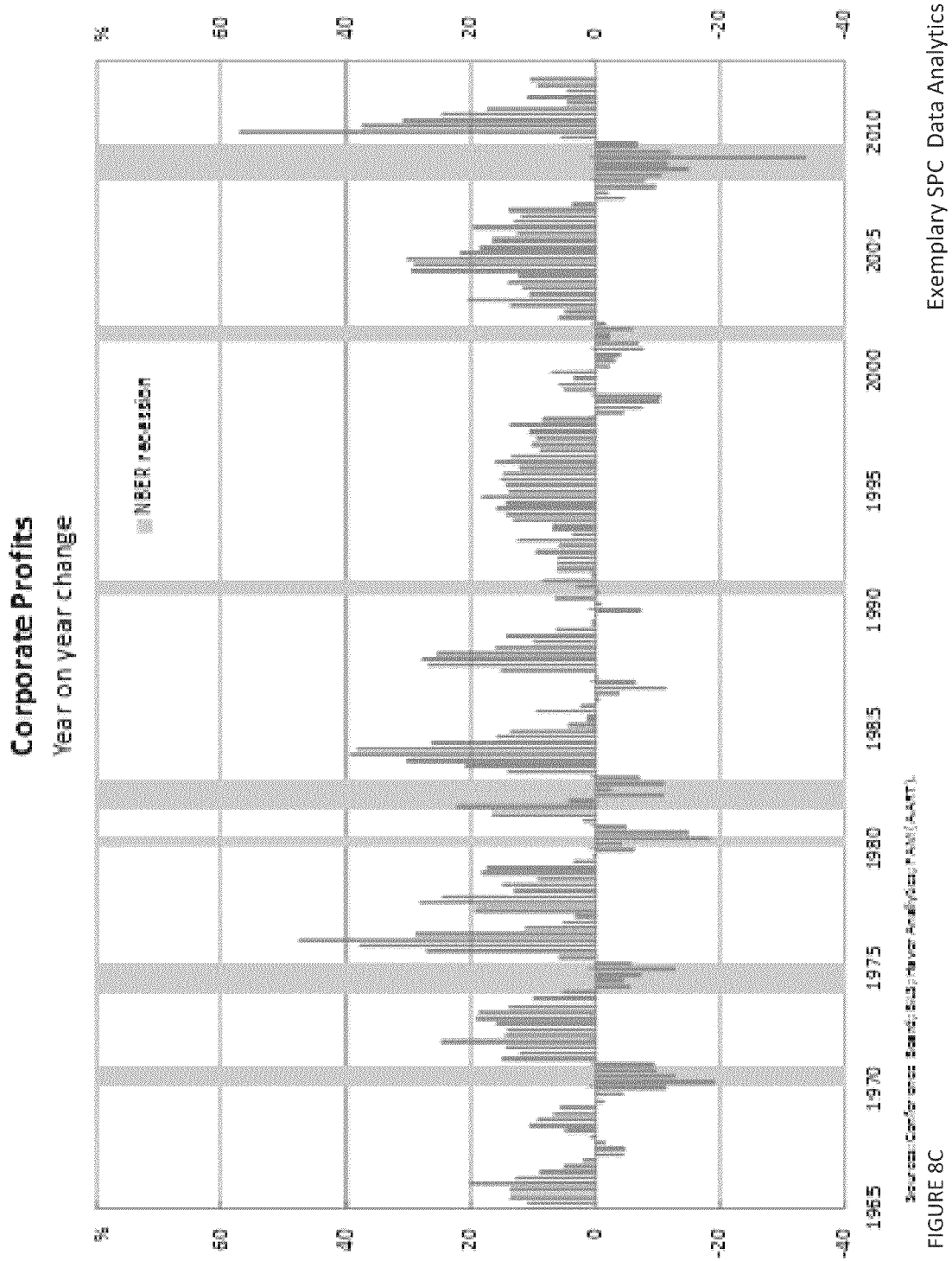
Figure 8D:
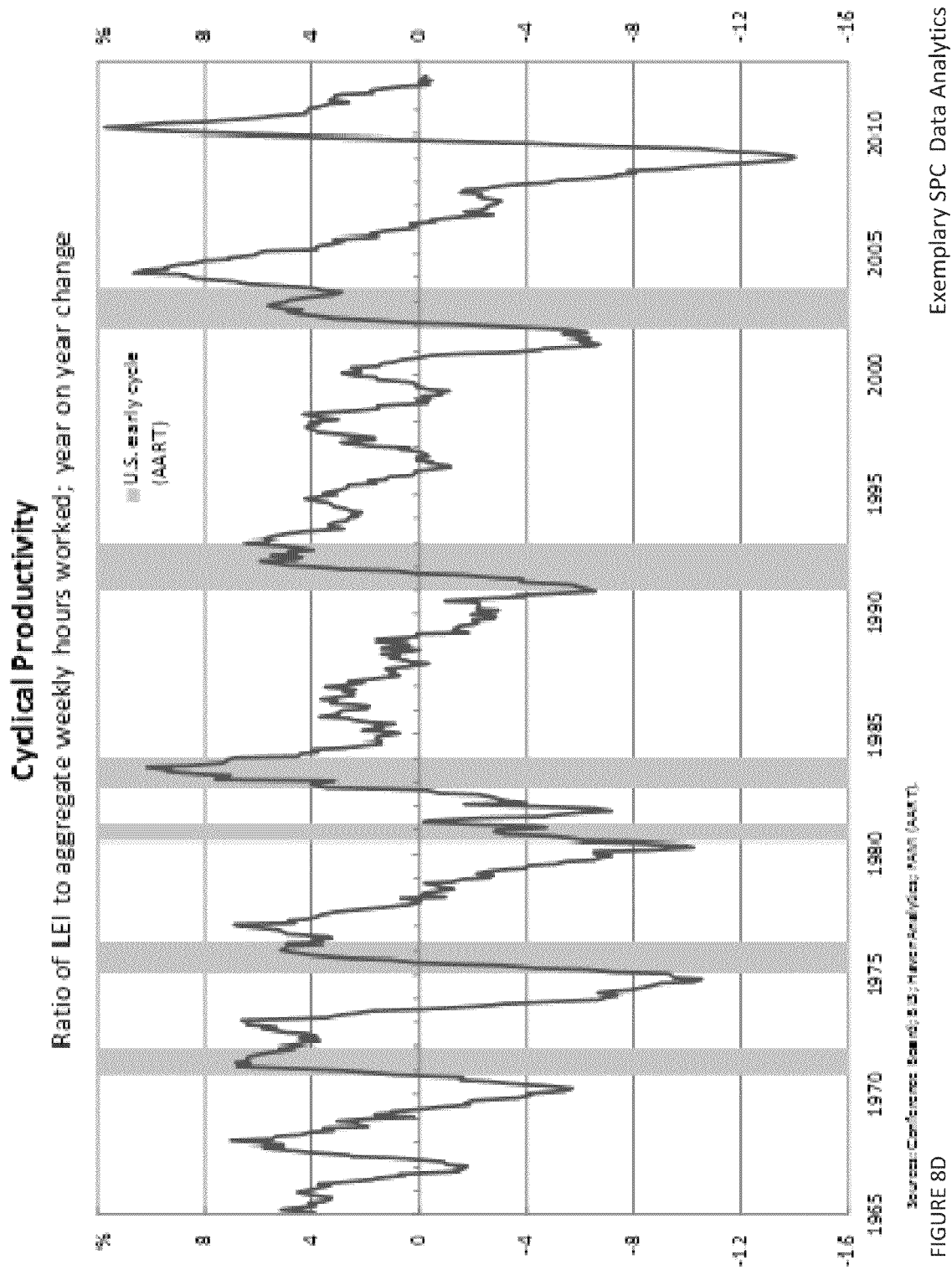
Figure 8E:
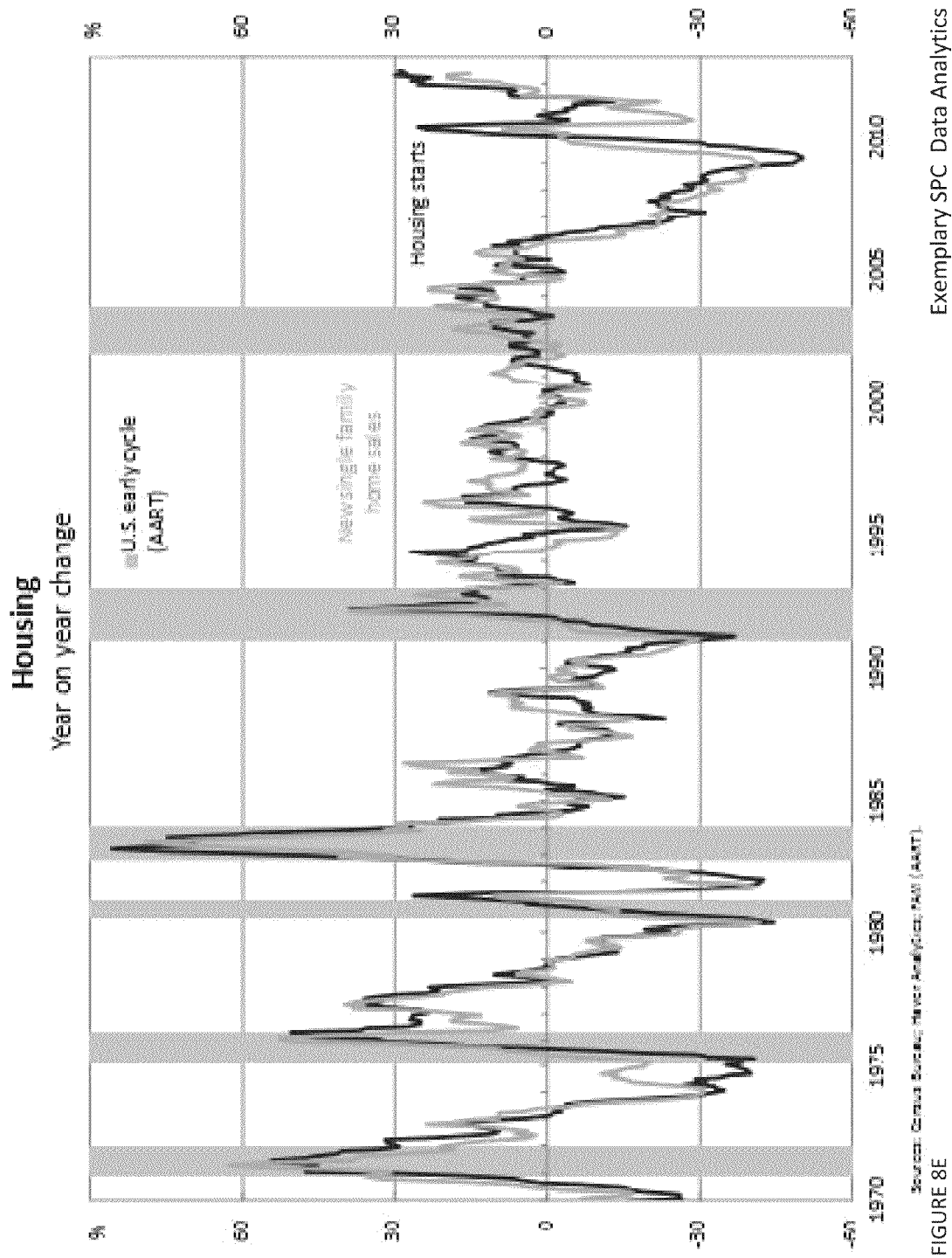

With reference to FIG. 8C, corporate profits may show the back of sharp margin expansion as sales picked up pace and production operations remained lean (e.g., see FIG. 8C). This period of soaring profits had ended by mid 2010 when firms began to hire again to add to capacity With reference to FIG. 8D, Our measure of 'cyclical productivity' corroborates this story (Chart 13). It too rebounded in early 2009, as leading indicators—including financial and manufacturing indicators—strengthened while the number of workers and their hours remained at low levels. By mid 2010, the recovery had steadied, and the labour market began its long process of recovery With reference to FIG. 8E, one sector that has the potential to give rise to some early-cycle dynamics is housing, where construction and sales have shown further signs of recovery (e.g., FIG. 8E). Since the 1970s, a housing recovery has signaled the beginning of most early-cycle periods. At the current juncture, it could offset some of the drag from other parts of the economy.

SPC Controller

FIG. 9 shows a block diagram illustrating example aspects of a SPC controller 901. In this embodiment, the SPC controller 901 may serve to aggregate, process, store, search, serve, identify, instruct, generate, match, and/or facilitate interactions with a computer through various technologies, and/or other related data.

Users, e.g., 933a, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SPC controller 901 may be connected to and/or communicate with entities such as, but not limited to: one or more users from user input devices 911, peripheral devices 912; an optional cryptographic processor device 928; and/or a communications network 913. For example, the SPC controller 901 may be connected to and/or communicate with users, e.g., 933a, operating client device(s), e.g., 933b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SPC controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeably throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing SPC controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA (2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale, and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the SPC controller and beyond through various interfaces. Should processing requirements dictate a greater amount speed and/or capacity, distributed processors (e.g., Distributed SPC), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the SPC may be achieved by implementing a microcontroller such as CAST's R8051XC2 microcontroller; Intel's MCS 51 (i.e., 8051 microcontroller); and/or the like. Also, to implement certain features of the SPC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SPC component collection (distributed or otherwise) and/or features may be implemented via the microprocessor and/or via embedded components; e.g., via ASIC, coprocessor, DSP, FPGA, and/or the like. Alternately, some implementations of the SPC may be implemented with embedded components that are configured and used to achieve a variety of features or signal processing.

Depending on the particular implementation, the embedded components may include software solutions, hardware solutions, and/or some combination of both hardware/software solutions. For example, SPC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the SPC features. A hierarchy of programmable interconnects allow logic blocks to be interconnected as needed by the SPC system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the SPC may be developed on regular FPGAs and then migrated into a fixed version that more resembles ASIC implementations. Alternate or coordinating implementations may migrate SPC controller features to a final ASIC instead of or in addition to FPGAs. Depending on the implementation all of the aforementioned embedded components and microprocessors may be considered the "CPU" and/or "processor" for the SPC.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the SPC thereby providing an electric current to all the interconnected components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, frequently, although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 910 may accept, communicate, and/or connect to a communications network 913. Through a communications network 913, the SPC controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SPC), architectures may similarly be employed to pool, load balance, and/or otherwise increase the communicative bandwidth required by the SPC controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth, cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the SPC controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the SPC controller may be embodied as an embedded, dedicated, and/or monitor-less (i.e., headless) device, wherein access may be provided over a network interface connection.

Cryptographic units such as, but not limited to, microcontrollers, processors 926, interfaces 927, and/or devices 928 may be attached, and/or communicate with the SPC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the SPC controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 929 may include ROM 906, RAM 905, and a storage device 914. A storage device 914 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the SPC component(s) 935; and/or the like (i.e., collectively a component collection). These components may be stored and accessed from the storage devices and/or from storage devices accessible through an interface bus. Although non-conventional program components such as those in the component collection may be stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the SPC controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SPC controller to communicate with other entities through a communications network 913. Various communication protocols may be used by the SPC controller as a subcarrier transport mechanism for interaction, such as, but not limited to: multicast, TCP/IP, UDP, unicast, and/or the like.

Information Server

An information server component 916 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SPC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SPC database 919, operating systems, other program components, user interfaces, Web browsers, and/or the like.

Access to the SPC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SPC. In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SPC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/14 Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the SPC equipped nodes. The combined application may be nugatory on systems employing standard Web browsers.

Mail Server

A mail server component 921 is a stored program component that is executed by a CPU 903. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the SPC.

Access to the SPC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SPC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SPC component to engage in secure transactions if so desired. The cryptographic component facilitates the secure accessing of resources on the SPC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SPC Database

The SPC database component 919 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SPC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SPC database is implemented as a data-structure, the use of the SPC database 919 may be integrated into another component such as the SPC component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-k*. A Users table 919*a* may include fields such as, but not limited to: user_id, user_device_id, username, password, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a SPC. A Devices table 919*b* may include fields such as, but not limited to: device_ID, device_name, device_IP, device_GPS, device_MAC, device_serial, device_ECID, device_UDID, device_browser, device_type, device_model, device_version, device_OS, device_apps_list, device_securekey, wallet_app_installed_flag, and/or the like. A Regression Models table 919*c* may include fields such as, but not limited to: model_ID, model_name, model_type, model_objective, model_input, model_output, model_structure, model_parameters, model_index, model_cycle_id, model_variables, and/or the like. A Cycle Phase table 919*d* may include fields such as, but not limited to: cycle_id, cycle_name, cycle_phase_name, cycle_funds, cycle_GDP, cycle_unemployment, cycle_benchmark, cycle_target_weight, cycle_etf, cycle_inflation, cycle_pe, and/or the like. A Data Provider table 919*e* may include fields such as, but not limited to: provide_id, provider_name, provider_type, provider_data_type, provider_index_type, provider_server_ip, provider_server_id, provider_url, and/or the like. A Funds table 919*f* may include fields such as, but not limited to: fund_id, fund_name, fund_etf, fund_type, fund_sector, fund_history, fund_performance, fund_min_investment, fund_return, fund_objective, and/or the like. A Portfolio table 919*g* may include fields such as, but not limited to portfolio_id, portfolio_name, portfolio_user_id, portfolio_constituent_type, portfolio_ portfolio_benchmark, portfolio_start_date, portfolio_end_date, portfolio_alert, portfolio_rebalance, portfolio_allocation, portfolio_return, and/or the like. A Trading Log table 919*h* may include fields such as, but not limited to: log_id, log_timestamp, log_instrument_id, log_portfolio_id, log_amount, log_exchange_id, log_quantity, and/or the like. A Performance table 919*i* may include fields such as, but not limited to: start_date, end_date, portfolio_id, return, sector_return, GDP, unemployment, inflation, what_if_return, index_return, and/or the like. A market data table 919*j* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. A Economic Indicator table 919*k* may include fields such as, but not limited to: Econ_data_id, econ_data_type, econ_data_name, econ_data_timestamp, econ_data_value, econ_data_unit, econ_and/or the like.

In one embodiment, the SPC database may interact with other database systems. For example, employing a distributed database system, queries and data access by search SPC component may treat the combination of the SPC database, an integrated data security layer database as a single database entity.

In one embodiment, user programs may contain various user interface primitives, which may serve to update the SPC. Also, various accounts may require custom database tables depending upon the environments and the types of clients the SPC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-k*. The SPC may be configured to keep track of various settings, inputs, and parameters via database controllers.

The SPC database may communicate to and/or with other components in a component collection, including itself, and/or facilities of the like. Most frequently, the SPC database communicates with the SPC component, other program components, and/or the like. The database may contain, retain, and provide information regarding other nodes and data.

The SPCs

The SPC component 935 is a stored program component that is executed by a CPU. In one embodiment, the SPC component incorporates any and/or all combinations of the aspects of the SPC discussed in the previous figures. As such, the SPC affects accessing, obtaining and the provision of information, services, transactions, and/or the like across various communications networks. The features and embodiments of the SPC discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SPC's features and facilities, and in many cases reduce the costs, energy consumption/requirements, and extend the life of SPC's underlying infrastructure; this has the added benefit of making the SPC more reliable. Similarly, many of the features and mechanisms are designed to be easier for users to use and access, thereby broadening the audience that may enjoy/employ and exploit the feature sets of the SPC; such ease of use also helps to increase the reliability of the SPC. In addition, the feature sets include heightened security as noted via the Cryptographic components 920, 926, 928 and throughout, making access to the features and data more reliable and secure.

The SPC component may transform user portfolio construction request (e.g., see 201 in FIG. 2, etc.) via SPC components, such as but not limited to Economic Data Collector 942 (e.g., see 303-305 in FIG. 3A, etc.), Portfolio Construction 943 (e.g., see FIG. 3C, etc.), Economic Cycle Phase Dating 944 (e.g., see FIGS. 3B and 4A-4B, etc.), Portfolio Execution 945 (e.g., see 372 in FIG. 3C, etc.), and/or the like into portfolio investment records (e.g., see 212 in FIG. 2, etc.), and/or the like and use of the SPC.

The SPC component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the SPC server employs a cryptographic server to encrypt and decrypt communications. The SPC component may communicate to and/or with other components in a component collection, including itself, and/or facilities of the like. Most frequently, the SPC component communicates with the SPC database, operating systems, other program components, and/or the like. The SPC may contain, communicate, generate, obtain, and/or provide program component, system, user, and/or data communications, requests, and/or responses.

Distributed SPCs

The structure and/or operation of any of the SPC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SPC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SPC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
$input=" ";
$input=socket_read($client, 1024);
$data .=$input;
} while ($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query ("INSERT INTO UserTable (transmission) VALUES ($data)"); // add data to UserTable table in a CLIENT database
mysql_close ("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein.

In order to address various issues and advance the art, the entirety of this application for SEASONAL PORTFOLIO CONSTRUCTION PLATFORM APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SPC individual and/or enterprise user, database configuration and/or relational model, data type, data transmission and/or network framework, syntax structure, and/or the like, various embodiments of the SPC may be implemented that allow a great deal of flexibility and customization. For example, aspects of the SPC may be adapted for operation management. While various embodiments and discussions of the SPC have been directed to investment portfolio management, however, it is to be understood that the embodiments described herein may be readily configured and/or customized for a wide variety of other applications and/or implementations.

What is claimed is:

1. A seasonal portfolio management apparatus, comprising:
a computing processor; and
a memory disposed in communication with the computing processor, and storing computing processor-executable instructions, said processor-executable instructions executable by the computing processor to:
obtain economic indicator data from a data provider;
instantiate a regression structure employing an economic indicator, said regression structure indicating a first economic cycle phase;
generate a probabilistic output indicating a probability that a current economic cycle phase belongs to the first economic cycle phase upon the instantiation of the regression structure;
retrieve a first optimal portfolio associated with the first economic cycle phase;
apply the probability as a first weight of the first optimal portfolio; and
construct the investment portfolio based on a weighted first optimal portfolio.

2. The apparatus of claim 1, wherein the economic indicator data comprises any of corporate profits, credit, employment, inventories, and monetary policy.

3. The apparatus of claim 1, wherein the regression structure comprises a binary probit model.

4. The apparatus of claim 1, wherein the economic cycle phase comprises any of an early-cycle phase, a mid-cycle phase, a late-cycle phase and a recession phase.

5. The apparatus of claim 1, wherein the probabilistic output comprises a numeric value between 0 and 1.

6. The apparatus of claim 1, wherein the weighted first optimal portfolio is weighted by the probability.

7. The apparatus of claim 1, wherein the construction of the investment portfolio comprises:
combining weighted optimal portfolios of each economic business cycle phase.

8. The apparatus of claim 1, wherein said processor-executable instructions executable by the computing processor to:
determine a historical economic cycle phase based on historical economic data indicators.

9. The apparatus of claim 8, wherein said processor-executable instructions executable by the computing processor to determine historical economic data characteristics associated with the first economic cycle phase.

10. The apparatus of claim 8, wherein said processor-executable instructions executable by the computing processor to develop an optimal portfolio for the first economic cycle phase.

11. The apparatus of claim 10, wherein the optimal portfolio comprises increased weight of equity asset in an early cycle.

12. The apparatus of claim 10, wherein the optimal portfolio further comprises any of minimizing asset turnover, minimizing potential volatility, and maximizing average returns.

13. A seasonal portfolio management processor-readable storage non-transitory medium storing processor-executable instructions issuable by a processor to:
obtain economic indicator data from a data provider;
instantiate a regression structure employing an economic indicator, said regression structure indicating a first economic cycle phase;

generate a probabilistic output indicating a probability that a current economic cycle phase belongs to the first economic cycle phase upon the instantiation of the regression structure;
retrieve a first optimal portfolio associated with the first economic cycle phase;
apply the probability as a first weight of the first optimal portfolio; and
construct the investment portfolio based on a weighted first optimal portfolio.

14. The medium of claim 13, wherein the economic indicator data comprises any of corporate profits, credit, employment, inventories, and monetary policy.

15. The medium of claim 13, wherein the regression structure comprises a binary probit model.

16. The medium of claim 13, wherein the economic cycle phase comprises any of an early-cycle phase, a mid-cycle phase, a late-cycle phase and a recession phase.

17. The medium of claim 13, wherein the probabilistic output comprises a numeric value between 0 and 1.

18. The medium of claim 13, wherein the weighted first optimal portfolio is weighted by the probability.

19. A seasonal portfolio management system, comprising:
means to obtain economic indicator data from a data provider;
means to instantiate a regression structure employing an economic indicator, said regression structure indicating a first economic cycle phase;
means to generate a probabilistic output indicating a probability that a current economic cycle phase belongs to the first economic cycle phase upon the instantiation of the regression structure;
means to retrieve a first optimal portfolio associated with the first economic cycle phase;
means to apply the probability as a first weight of the first optimal portfolio; and
means to construct the investment portfolio based on a weighted first optimal portfolio.

20. A seasonal portfolio management processor-implemented method, comprising:
obtaining by a computer processor economic indicator data from a data provider;
instantiating by the computer processor a regression structure employing an economic indicator, said regression structure indicating a first economic cycle phase;
generating by the computer processor a probabilistic output indicating a probability that a current economic cycle phase belongs to the first economic cycle phase upon the instantiation of the regression structure;
retrieving by the computer processor a first optimal portfolio associated with the first economic cycle phase;
applying by the computer processor the probability as a first weight of the first optimal portfolio; and
constructing by the computer processor the investment portfolio based on a weighted first optimal portfolio.

* * * * *